US011157287B2

(12) United States Patent
Talpes et al.

(10) Patent No.: US 11,157,287 B2
(45) Date of Patent: Oct. 26, 2021

(54) COMPUTATIONAL ARRAY MICROPROCESSOR SYSTEM WITH VARIABLE LATENCY MEMORY ACCESS

(71) Applicant: Tesla, Inc., Palo Alto, CA (US)

(72) Inventors: Emil Talpes, San Mateo, CA (US);
Peter Joseph Bannon, Woodside, CA (US); Kevin Altair Hurd, Redwood City, CA (US)

(73) Assignee: Tesla, Inc., Palo Alto, CA (US)

( * ) Notice: Subject to any disclaimer, the term of this patent is extended or adjusted under 35 U.S.C. 154(b) by 43 days.

(21) Appl. No.: 15/920,150

(22) Filed: Mar. 13, 2018

(65) Prior Publication Data
US 2019/0026237 A1     Jan. 24, 2019

Related U.S. Application Data

(63) Continuation-in-part of application No. 15/710,433, filed on Sep. 20, 2017, now Pat. No. 10,671,349.
(Continued)

(51) Int. Cl.
*G06F 9/38* (2018.01)
*G06F 15/80* (2006.01)
(Continued)

(52) U.S. Cl.
CPC .......... *G06F 9/3887* (2013.01); *G06F 3/0613* (2013.01); *G06F 3/0631* (2013.01);
(Continued)

(58) Field of Classification Search
CPC ........ G06F 17/16; G06F 3/08; G06F 15/8053; G06F 15/8092; G06F 13/1642;
(Continued)

(56) References Cited

U.S. PATENT DOCUMENTS 5,239,639 A * 8/1993 Fischer ............... G06F 13/1689
711/E12.004
5,267,185 A * 11/1993 Akabane ................. G06F 17/16
708/520
(Continued)

FOREIGN PATENT DOCUMENTS

EP         0422348 A2     4/1991
JP         04-295953      10/1992
(Continued)

OTHER PUBLICATIONS

Cornu et al., "Design, Implementation, and Test of a Multi-Model SYstolic Neural-Network Accelerator", Scientific Programming-Parallel Computing Projects of the Swiss Priority Programme, vol. 5, No. 1, Jan. 1, 1996.
(Continued)

*Primary Examiner* — William B Partridge
*Assistant Examiner* — Kasim Alli
(74) *Attorney, Agent, or Firm* — Knobbe, Martens, Olson & Bear, LLP

(57) ABSTRACT

A microprocessor system comprises a computational array and a hardware arbiter. The computational array includes a plurality of computation units. Each of the plurality of computation units operates on a corresponding value addressed from memory. The hardware arbiter is configured to control issuing of at least one memory request for one or more of the corresponding values addressed from the memory for the computation units. The hardware arbiter is also configured to schedule a control signal to be issued based on the issuing of the memory requests.

21 Claims, 12 Drawing Sheets

Related U.S. Application Data

(60) Provisional application No. 62/635,399, filed on Feb. 26, 2018, provisional application No. 62/625,251, filed on Feb. 1, 2018, provisional application No. 62/536,399, filed on Jul. 24, 2017.

(51) Int. Cl.
*G06F 13/16* (2006.01)
*G06F 17/16* (2006.01)
*G06F 3/06* (2006.01)

(52) U.S. Cl.
CPC ...... *G06F 13/1642* (2013.01); *G06F 13/1663* (2013.01); *G06F 13/1689* (2013.01); *G06F 15/8007* (2013.01); *G06F 17/16* (2013.01)

(58) Field of Classification Search
CPC ............. G06F 13/1689; G06F 15/8023; G06F 15/8007; G06F 9/3887
See application file for complete search history.

(56) References Cited

U.S. PATENT DOCUMENTS

| | | | |
|---|---|---|---|
| 5,311,459 | A | 5/1994 | D'Luna |
| 5,333,296 | A * | 7/1994 | Bouchard ............ G06F 7/483 711/117 |
| 5,471,627 | A | 11/1995 | Means |
| 5,519,864 | A * | 5/1996 | Martell ............ G06F 9/3836 710/5 |
| 5,600,843 | A | 2/1997 | Kato |
| 5,717,947 | A | 2/1998 | Gallup et al. |
| 5,742,782 | A | 4/1998 | Ito |
| 5,850,530 | A * | 12/1998 | Chen ............ G06F 13/364 710/113 |
| 5,887,183 | A * | 3/1999 | Agarwal ............ G06F 15/8092 712/2 |
| 6,122,722 | A | 9/2000 | Slavenburg |
| 6,195,674 | B1 | 2/2001 | Elbourne |
| 8,924,455 | B1 | 12/2014 | Barman |
| 9,697,463 | B2 | 7/2017 | Ross |
| 10,074,051 | B2 | 9/2018 | Thorson |
| 10,489,478 | B2 | 11/2019 | Shalev |
| 2005/0125369 | A1 | 6/2005 | Buck |
| 2007/0255903 | A1 | 11/2007 | Tsadik |
| 2009/0192958 | A1 | 7/2009 | Todorokihara |
| 2010/0017351 | A1 | 1/2010 | Hench |
| 2011/0029471 | A1 | 2/2011 | Chakradhar |
| 2011/0239032 | A1 | 9/2011 | Kato et al. |
| 2012/0017066 | A1 | 1/2012 | Vorbach et al. |
| 2012/0323832 | A1 | 12/2012 | Snook |
| 2013/0159665 | A1 | 6/2013 | Kashyap |
| 2014/0046995 | A1 | 2/2014 | Fanous |
| 2014/0089232 | A1 | 3/2014 | Buibas |
| 2014/0142929 | A1 | 5/2014 | Seide |
| 2014/0180989 | A1 | 6/2014 | Krizhevsky |
| 2014/0277718 | A1 | 9/2014 | Izhikevich |
| 2014/0351190 | A1 | 11/2014 | Levin |
| 2015/0046332 | A1 | 2/2015 | Adjaoute |
| 2015/0199272 | A1 | 7/2015 | Goel |
| 2015/0331832 | A1 | 11/2015 | Minoya |
| 2016/0342889 | A1 | 11/2016 | Thorson |
| 2016/0342890 | A1 | 11/2016 | Young |
| 2016/0342891 | A1 | 11/2016 | Ross |
| 2016/0342892 | A1 | 11/2016 | Ross |
| 2016/0342893 | A1 | 11/2016 | Ross |
| 2016/0364334 | A1 | 12/2016 | Asaro |
| 2016/0379109 | A1 | 12/2016 | Chung |
| 2017/0052785 | A1 | 2/2017 | Uliel |
| 2017/0060811 | A1 * | 3/2017 | Yang ............ G06F 9/3001 |
| 2017/0103298 | A1 | 4/2017 | Ling |
| 2017/0103299 | A1 | 4/2017 | Aydonat |
| 2017/0103313 | A1 | 4/2017 | Ross et al. |
| 2017/0103318 | A1 | 4/2017 | Ross |
| 2017/0193360 | A1 | 7/2017 | Gao |
| 2017/0277537 | A1 | 9/2017 | Grocutt |
| 2017/0277658 | A1 | 9/2017 | Pratas |
| 2018/0032857 | A1 | 2/2018 | Lele |
| 2018/0046900 | A1 | 2/2018 | Daily |
| 2018/0107484 | A1 | 4/2018 | Sebexen |
| 2018/0157961 | A1 | 6/2018 | Henry |
| 2018/0157962 | A1 | 6/2018 | Henry |
| 2018/0157966 | A1 | 6/2018 | Henry |
| 2018/0189633 | A1 | 7/2018 | Henry |
| 2018/0189639 | A1 | 7/2018 | Henry |
| 2018/0189640 | A1 | 7/2018 | Henry |
| 2018/0189649 | A1 | 7/2018 | Naranyan |
| 2018/0189651 | A1 | 7/2018 | Henry |
| 2018/0197067 | A1 | 7/2018 | Mody |
| 2018/0247180 | A1 | 8/2018 | Cheng |
| 2018/0260220 | A1 | 9/2018 | Lacy |
| 2018/0307438 | A1 | 10/2018 | Huang |
| 2018/0315153 | A1 | 11/2018 | Park |
| 2018/0336164 | A1 | 11/2018 | Phelps |
| 2019/0011551 | A1 | 1/2019 | Yamamoto |
| 2019/0026078 | A1 | 1/2019 | Bannon |
| 2019/0026237 | A1 | 1/2019 | Talpes |
| 2019/0026249 | A1 | 1/2019 | Talpes |
| 2019/0026250 | A1 | 1/2019 | Das Sarma |
| 2019/0088948 | A1 | 3/2019 | Rasale |
| 2019/0311253 | A1 | 10/2019 | Chung |
| 2019/0370645 | A1 | 12/2019 | Lee |
| 2021/0048984 | A1 | 2/2021 | Bannon |

FOREIGN PATENT DOCUMENTS

| | | |
|---|---|---|
| JP | 2010-079840 | 4/2010 |
| JP | 2015-056124 | 3/2015 |
| JP | 2017-027149 | 2/2017 |
| WO | WO 94/10638 | 5/1994 |
| WO | WO-2014025765 A2 | 2/2014 |
| WO | WO-2016099779 A1 | 6/2016 |
| WO | WO-2016186811 A1 | 11/2016 |
| WO | WO-2016186823 A1 | 11/2016 |
| WO | WO-2017117186 A1 | 7/2017 |

OTHER PUBLICATIONS

Kim et al., "A Large-scale Architecture for Restricted Boltzmann Machines", Department of Electrical Engineering Stanford University, 2010 18th IEEE Annual International Symposium on, IEEE, Piscataway, NJ, USA, May 2, 010.

Krizhevsky et al., "ImageNet Classification with Deep Convolutional Neural Networks", downloaded from <http://papers.nips.cc/book/advances-in-neural-information-processing-systems-25-2012>, The 26th annual conference on Neural Information Processing Systems: Dec. 3-8, 2012.

Kung S: "VLSI Array Processors", IEEE ASSP Magazine, IEEE. US, vol. 2, No. 3, Jul. 1985.

Sato et al., "An in-depth look at Google's first Tensor Processing Unit (TPU)", posted in Goggle Cloud Big Data and Machine Learning Blog, downloaded from internet, <URL: https://cloud.google.com/blog/big-data/>, posted May 12, 2017.

Jouppi et al., Jun. 26, 2017, In-datacenter performance analysis of a tensor processing unit, 44th International symposium on Computer Architecture IKSCA), Toronto, Canada, 28 pp.

Oxford Dictionary, Definition of synchronize, retrieved Sep. 12, 2020, https://www/lexico.com/en/definition/synchronize.

Wikipedia, Accumulator (computing), downloaded Jul. 14, 2017.

International Search Report and Written Opinion dated Oct. 1, 2018, in International Patent Application No. PCT/US18/42959.

International Search Report and Written Opinion dated Sep. 10, 2018 in application No. PCT/US18/38618.

* cited by examiner

COMPUTATIONAL ARRAY MICROPROCESSOR SYSTEM WITH VARIABLE LATENCY MEMORY ACCESS

CROSS REFERENCE TO OTHER APPLICATIONS

This application claims priority to U.S. Provisional Patent Application No. 62/635,399 entitled A COMPUTATIONAL ARRAY MICROPROCESSOR SYSTEM WITH VARIABLE LATENCY MEMORY ACCESS filed Feb. 26, 2018, and this application claims priority to U.S. Provisional Patent Application No. 62/625,251 entitled VECTOR COMPUTATIONAL UNIT filed Feb. 1, 2018, and this application claims priority to U.S. Provisional Patent Application No. 62/536,399 entitled ACCELERATED MATHEMATICAL ENGINE filed Jul. 24, 2017, and this application is a continuation-in-part of co-pending U.S. patent application Ser. No. 15/710,433 entitled ACCELERATED MATHEMATICAL ENGINE filed Sep. 20, 2017, which claims priority to U.S. Provisional Patent Application No. 62/536,399 entitled ACCELERATED MATHEMATICAL ENGINE filed Jul. 24, 2017, all of which are incorporated herein by reference for all purposes.

BACKGROUND OF THE INVENTION

Performing inference on a machine learning model typically requires retrieving data from memory and applying one or more computational array operations on the data. Applications of machine learning, such as those targeting self-driving and driver-assisted automobiles, often utilize computational array operations to calculate matrix and vector results. These operations require loading data, such captured sensor data, and performing image processing to identify key features, such as lane markers and other objects in a scene. Traditionally, these operations may be implemented using a generic microprocessor system that loads the computation data from memory before performing a computational array instruction. While the data is loading, the microprocessor system often sits idle. The software platform running these applications will initiate the computational array instruction once the data has completed loading. The length of stalls and the time required to synchronize the computational operation with the retrieved data can be particularly long for when accessing variable latency memory. Stalls and synchronization efforts by the software platform reduce the efficiency of the microprocessor system and result in higher power consumption and lower throughput. Therefore, there exists a need for a microprocessor system with increased throughput that performs array computational operations using variable latency memory access.

BRIEF DESCRIPTION OF THE DRAWINGS

Various embodiments of the invention are disclosed in the following detailed description and the accompanying drawings.

DETAILED DESCRIPTION

Figure 1:
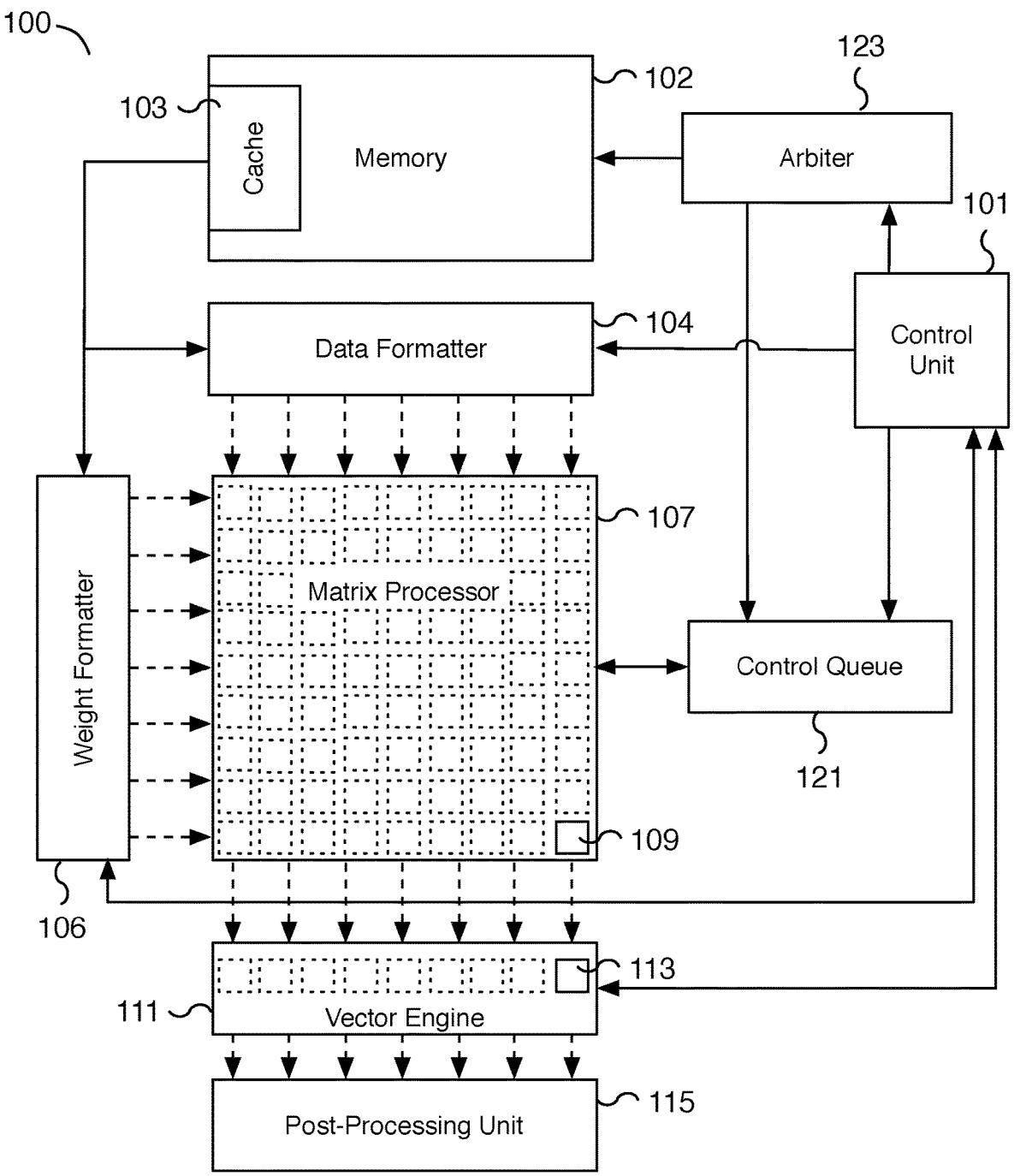
FIG. 1 is a block diagram illustrating an embodiment of a microprocessor system for performing machine learning processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One technique for loading a large number of elements and synchronizing the loading of the elements with a control operation is to stall the microprocessor system pending the completion of each memory read. A software platform is configured to initiate the load of the data from memory by issuing a processor instruction and the processor stalls until the load is complete. While the memory read is pending, the software platform waits for the load to complete. Upon completion of the memory read, a next processor instruction corresponding to a computational operation is processed and the data arguments are prepared using the result of the memory read. This computational operation instruction specifying a computational operation and operands is issued for processing by the computational array. An alternative technique requires stalling the processor and waiting for an interrupt to resume the execution of the processor. Both these techniques incur significant performance penalties waiting for the memory read request to be granted access to memory and for the memory read to be performed once access has been granted. Moreover, the techniques increase power consumption by stalling the microprocessor system while each memory read completes. Since the memory reads incur an access time with a variable latency, the length of each stall is difficult to predict. A microprocessor system relying on these techniques is limited in both its throughput and power efficiency.

To address these limitations, a microprocessor system for performing high throughput array computational operations is disclosed. In some embodiments, a microprocessor system includes a hardware arbiter to manage memory requests and is in communication with a control unit and a control queue to synchronize computational operations associated with the memory requests. The hardware arbiter queues memory read requests to retrieve data from memory with variable access latency. Each request is queued until the request is granted access to memory and the request can be serviced. A control queue queues a control operation that corresponds to the memory request and describes a computational operation. The dequeueing of the control operation is synchronized with the availability of the data retrieved via the memory read request. The synchronization allows the data retrieved from memory and the control operation to be synchronized and provided to a computational array together to perform a computational operation.

In various embodiments, a microprocessor system comprises at least a computational array and a hardware arbiter for performing arbitration of memory access requests and synchronizing the granted requests with a control unit. For example, a microprocessor system includes a hardware arbiter for controlling memory access requests to data that is operated on by a computational array such as a matrix processor. The computational array includes a plurality of computation units, wherein each of the plurality of computation units operates on a corresponding value addressed from memory. For example, a value address from memory may correspond to a portion of sensor data that is first loaded from memory before it can be fed to a corresponding computation unit of the computational array. In some embodiments, the hardware arbiter is configured to control the issuing of at least one memory request for one or more of the corresponding value addressed from the memory for the computation units. For example, the hardware arbiter receives memory read requests and queues them until each corresponding request is granted access by the hardware arbiter to read from memory. In some embodiments, the hardware arbiter is configured to schedule a control signal to be issued based on the issuing of the memory requests. For example, once the hardware arbiter grants a memory request, the hardware arbiter sends a ready control signal corresponding to the memory read request. In some embodiments, the ready signal is sent once the read has completed. In various embodiments, the ready signal is received and results in the release of a queued control operation so that the operation can be made available at a computational array together with the data read from memory. In various embodiments, the data is first formatted by a hardware data formatter before presented to a computational array.

In some embodiments, a microprocessor system includes a computational array (e.g., matrix processor) in communication with a hardware data formatter for aligning the data to minimize data reads and the latency incurred by reading input data for processing. For example, a matrix processor allows a plurality of elements of a matrix and/or vector to be loaded and processed in parallel together. Thus, using data formatted by one or more hardware data formatters, a computational operation such as a convolution operation may be performed by the computational array.

One technique includes loading a large number of consecutive elements (e.g., consecutive in memory) of a matrix/vector together and performing operations on the consecutive elements in parallel using the matrix processor. By loading consecutive elements together, a single memory load and/or cache check for the entire group of elements can be performed—allowing the entire group of elements to be loaded using minimal processing resources. However, requiring the input elements of each processing iteration of the matrix processor to be consecutive elements could potentially require the matrix processor to load a large number of matrix/vector elements that are to be not utilized. For example, performing a convolution operation using a stride greater than one requires access to matrix elements that are not consecutive. If parallel input elements to the matrix processor are required to be consecutive, each processing iteration of the matrix processor is unable to fully utilize every individual input element for workloads only requiring non-consecutive elements. An alternative technique is to not require every individual input element of the matrix processor be consecutive (e.g., every individual input element can be independently specified without regard to whether it is consecutive in memory to a previous input element). This technique incurs significant performance costs since each referenced element incurs the cost of determining its memory address and performing a cache check for the individual element with the potential of an even more expensive load from memory in the case of a cache miss.

In an embodiment of a disclosed microprocessor system, the group of input elements of a matrix processor are divided into a plurality of subsets, wherein elements within each subset are required be consecutive but the different subsets are not required to be consecutive. This allows the benefit of reduce resources required to load consecutive elements within each subset while providing the flexibility of loading non-consecutive elements across the different subsets. For example, a hardware data formatter loads multiple subsets of elements where the elements of each subset are located consecutively in memory. By loading the elements of each subset together, a memory address calculation and cache check is performed only with respect to the start and end elements of each subset. In the event of a cache miss, an entire subset of elements is loaded together from memory. Rather than incurring a memory lookup penalty on a per element basis as with the previous discussed technique, a cache check is minimized to two checks for each subset (the start and end elements) and a single memory read for the entire subset in the event of a cache miss. Computational operations on non-consecutive elements, such as the performing convolution using a stride greater than one, are more efficient since the memory locations of the subsets need not be consecutively located in memory. Using the disclosed system and techniques, computational operations may be performed on non-consecutive elements with increased throughput and a high clock frequency.

In various embodiments, a computational array performs matrix operations involving input vectors and includes a plurality of computation units to receive M operands and N operands from the input vectors. Using a sequence of input vectors, a computational array may perform matrix operations such as a matrix multiplication. In some embodiments, the computation units are sub-circuits that include an arithmetic logic unit, an accumulator, a shadow register, and a shifter for performing operations such as generating dot-products and various processing for convolution. Unlike conventional graphical processing unit (GPU) or central processing unit (CPU) processing cores, where each core is configured to receive its own unique processing instruction, the computation units of the computational array each perform the same computation in parallel in response to an individual instruction received by the computational array.

In various embodiments, the data input to the computational array is prepared using a hardware data formatter. For example, a hardware data formatter is utilized to load and align data elements using subsets of elements where the elements of each subset are located consecutively in memory and the subsets need not be located consecutively in memory. In various embodiments, the various subsets may each have a memory location independent from other subsets. For example, the different subsets may be located non-consecutively in memory from one another. By restricting the data elements within a subset to consecutive data, multiple consecutive data elements are processed together, which minimizes the calculations and delay incurred when preparing the data for a computational array. For example, a subset of data elements may be cached as a consecutive sequence of data elements by performing a cache check on the start and end element and, in the event of a cache miss on either element, a single data read to load the entire subset from memory into a memory cache. Once all the data elements are available, the data may be provided together to the computational array as a group of values to be processed in parallel.

In some embodiments, a microprocessor system comprises a computational array and a hardware data formatter. For example, a microprocessor system includes a matrix processor capable of performing matrix and vector operations. In various embodiments, the computational array includes a plurality of computation units. For example, the computation units may be sub-circuits of a matrix processor that include the functionality for performing one or more multiply, add, accumulate, and shift operations. As another example, computation units may be sub-circuits that include the functionality for performing a dot-product operation. In various embodiments, the computational array includes a sufficient number of computation units for performing multiple operations on the data inputs in parallel. For example, a computational array configured to receive M operands and N operands may include at least M×N computation units. In various embodiments, each of the plurality of computation units operates on a corresponding value formatted by a hardware data formatter and the values operated by the plurality of computation units are synchronously provided together to the computational array as a group of values to be processed in parallel. For example, values corresponding to elements of a matrix are processed by one or more hardware data formatters and provided to the computational array together as a group of values to be processing in parallel.

In various embodiments, a hardware data formatter is configured to gather the group of values to be processed in parallel by the computational array. For example, a hardware data formatter retrieves the values from memory, such as static random access memory (SRAM), via a cache. In some embodiments, in the event of a cache miss, the hardware data formatter loads the values into the cache from memory and subsequently retrieves the values from the cache. In various embodiments, the values provided to the computational array correspond to computational operands. For example, a hardware formatter may process M operands as an input vector to a computational array. In various embodiments, a second hardware formatter may process N operands as a second input vector to the computational array. In some embodiments, each hardware data formatter processes a group of values synchronously provided together to the computational array, where each group of values includes a first subset of values located consecutively in memory and a second subset of values located consecutively in memory, yet the first subset of values are not located consecutively in the memory from the second subset of values. For example, a hardware data formatter loads a first subset of values stored consecutively in memory and a second subset of values also stored consecutively in memory but with a gap in memory between the two subsets of values. Each subset of values is loaded as consecutive values into the hardware data formatter. To prepare an entire vector of inputs for a computational array, the hardware data formatter performs loads based on the number of subsets instead of based on the total number of elements needed for an input operand to a computational array.

FIG. 1 is a block diagram illustrating an embodiment of a microprocessor system for performing machine learning processing. In the example shown, microprocessor system 100 includes control unit 101, memory 102, cache 103, control queue 121, arbiter 123, data formatter 104, weight formatter 106, matrix processor 107, vector engine 111, and post-processing unit 115. Cache 103 is a memory cache for memory 102 to reduce latency when reading data. Memory 102 and cache 103 store data that is fed to hardware data formatters data formatter 104 and weight formatter 106. Control unit 101 feeds control operations including operations for a computational array to control queue 121 where the control operations are queued. Arbiter 123 controls access to memory 102 and determines which memory read requests for memory 102 are granted. Arbiter 123 signals control queue 121 when a memory request for a corresponding queued control operation is granted and/or performed. Control queue 121 receives a signal, such as a ready signal, from arbiter 123 and dequeues the control operation associated with the memory read that was granted access to memory and/or performed. Control queue 121 dequeues the control operation and provides the operation to matrix processor 107 in sync with the operands provided by data formatter 104 and weight formatter 106.

In the example shown, data formatter 104 and weight formatter 106 are hardware data formatters for preparing data for matrix processor 107. In various embodiments, the data values received at data formatter 104 and/or the weight values received data weight formatter 106 are provided by memory 102 and/or cache 103. In various embodiments, the values are requested by the data formatter 104 and/or weight formatter 106. In some embodiments, the values are requested by control unit 101 and provided to data formatter 104 and/or weight formatter 106. In some embodiments, data formatter 104 and weight formatter 106 include a logic circuit for preparing data for matrix processor 107 and/or a memory cache or buffer for storing and processing input data. For example, data formatter 104 may prepare N operands from a two-dimensional array retrieved from memory 102 (potentially via cache 103) that correspond to image data. Weight formatter 106 may prepare M operands retrieved from memory 102 (potentially via cache 103) that correspond to a vector of weight values. Data formatter 104 and weight formatter 106 prepare the N and M operands to be processed by matrix processor 107. In some embodiments, microprocessor system 100, including at least hardware data formatters data formatter 104 and weight formatter 106, matrix processor 107, vector engine 111, and post-processing unit 115, perform the processes described below with respect to FIGS. 2, 3, 7, 8, and 10-12. In various embodiments, at least control unit 101, hardware arbiter 123, and control queue 121 are used to perform the processes described below with respect to FIGS. 10-12.

In some embodiments, matrix processor 107 is a computational array that includes a plurality of computation units. For example, a matrix processor receiving M operands and N operands from weight formatter 106 and data formatter 104, respectively, includes M×N computation units. In the figure shown, the small squares inside matrix processor 107 depict that matrix processor 107 includes a logical two-dimensional array of computation units. Computation unit 109 is one of a plurality of computation units of matrix processor 107. In some embodiments, each computation unit is configured to receive one operand from data formatter 104 and one operand from weight formatter 106. In some embodiments, the computation units are configured according to a logical two-dimensional array but the matrix processor is not necessarily fabricated with computation units laid out as a physical two-dimensional array. For example, the i-th operand of data formatter 104 and the j-th operand of weight formatter 106 are configured to be processed by the i-th×j-th computation unit of matrix processor 107.

In various embodiments, the data width of components data formatter 104, weight formatter 106, matrix processor 107, vector engine 111, and post-processing unit 115 are wide data widths and include the ability to transfer more than one operand in parallel. In some embodiments, data formatter 104 and weight formatter 106 are each 96-bytes wide. In some embodiments, data formatter 104 is 192-bytes wide and weight formatter 106 is 96-bytes wide. In various embodiments, the width of data formatter 104 and weight formatter 106 is dynamically configurable. For example, data formatter 104 may be dynamically configured to 96 or 192 bytes and weight formatter 106 may be dynamically configured to 96 or 48 bytes. In some embodiments, the dynamic configuration is controlled by control unit 101. In various embodiments, a data width of 96 bytes allows 96 operands to be processed in parallel. For example, in an embodiment with data formatter 104 configured to be 96-bytes wide, data formatter 104 can transfer 96 operands to matrix processor 107 in parallel.

In various embodiments, memory 102 and/or cache 103 provide input data to hardware data formatters data formatter 104 and weight formatter 106 based on memory addresses calculated by the hardware data formatters. In some embodiments, data formatter 104 and/or weight formatter 106 retrieves, via memory 102 and/or cache 103, a stream of data corresponding to one or more subsets of values stored consecutively in memory. Data formatter 104 and/or weight formatter 106 may retrieve one or more subsets of values stored consecutively in memory and prepare the data as input values for matrix processor 107. In various embodiments, the one or more subsets of values are not themselves stored consecutively in memory with other subsets of values. In some embodiments, memory 102 is a memory module that contains a single read port. In some embodiments, memory 102 is static random access memory (SRAM). In some embodiments, the memory contains a limited number of read ports and the number of read ports is fewer than the data width of components data formatter 104, weight formatter 106, matrix processor 107, vector engine 111, and/or post-processing unit 115. In various embodiments, reads to memory 102 are managed by arbiter 123. Arbiter 123 queues the read requests and determines when each read request may be granted access to memory 102. In various embodiments, the request are queued in a first-in-first-out manner by arbiter 123. In some embodiments, the requests are queued by arbiter 123 by associating a priority with each request. In various embodiments, once a read request is granted access to memory and/or the read is performed, arbiter 123 signals control queue 121 that the read is or will be ready in a fixed number of clock cycles. In some embodiments, arbiter 123 signals control queue 121 that the read has been initiated. In some embodiments, arbiter 123 signals control queue 121 that the read has completed. In various embodiments, the read allowed by arbiter 123 results in data read and transferred to data formatter 104 and/or weight formatter 106. In some embodiments, a hardware data formatter, such as data formatter 104 and weight formatter 106, which will perform a cache check on cache 103 to determine whether each subset of values is in cache 103 prior to issuing a read request to memory 102. In various embodiments, the read request is issued to arbiter 123. In the event the subset of values is cached, a hardware data formatter (e.g., data formatter 104 or weight formatter 106) will retrieve the data from cache 103. In various embodiments, in the event of a cache miss, the hardware data formatter (e.g., data formatter 104 or weight formatter 106) will retrieve the entire subset of values from memory 102 and populate cache 103 with the retrieved values.

In various embodiments, control queue 121 queues control operations to matrix processor 107 in order to synchronize the arrival of a control operation at matrix processor 107 with the arrival of the corresponding operands from data formatter 104 and/or weight formatter 106. For example, control queue 121 includes a first-in-first-out queue for queuing computational operations, such as matrix operations and/or convolution operations, for a computational array such as a matrix processor. Control queue 121 receives a signal from arbiter 123, such as a ready signal, when the corresponding operands for a queued control operation are ready. In some embodiments, the ready state is based on the operands for matrix processor 107 being available in a fixed number of clock cycles. In some embodiments, the ready signal corresponds to the memory access granted for reading the operands from memory 102. In some embodiments, the ready signal corresponds to the memory read completing for the operands corresponding to queued control operation. Although not depicted in FIG. 1, in some embodiments, control queue 121 is part of control unit 101.

In various embodiments, matrix processor 107 is configured to receive N bytes from data formatter 104 and M bytes from weight formatter 106 and includes at least M×N computation units. For example, matrix processor 107 may be configured to receive 96 bytes from data formatter 104 and 96 bytes from weight formatter 106 and includes at least 96×96 computation units. As another example, matrix processor 107 may be configured to receive 192 bytes from data formatter 104 and 48 bytes from weight formatter 106 and includes at least 192×48 computation units. In various embodiments, the dimensions of matrix processor 107 may be dynamically configured. For example, the default dimensions of matrix processor 107 may be configured to receive 96 bytes from data formatter 104 and 96 bytes from weight formatter 106 but the input dimensions may be dynamically configured to 192 bytes and 48 bytes, respectively. In various embodiments, the output size of each computation unit is equal to or larger than the input size. For example, in some embodiments, the input to each computation unit is two 1-byte operands, one corresponding to an operand from data formatter 104 and one from weight formatter 106, and the output of processing the two operands is a 4-byte result. As another example, matrix processor 107 may be configured to receive 96 bytes from data formatter 104 and 96 bytes from weight formatter 106 and output 96 4-byte results. In some embodiments, the output of matrix processor 107 is a vector. For example, a matrix processor configured to receive two 96-wide input vectors, where each element (or operand) of the input vector is one byte in size, can output a 96-wide vector result where each element of the vector result is 4-bytes in size.

In various embodiments, each computation unit of matrix processor 107 is a sub-circuit that includes an arithmetic logic unit, an accumulator, and a shadow register. In the example shown, the computation units of matrix processor 107 can perform an arithmetic operation on the M operands and N operands from weight formatter 106 and data formatter 104, respectively. In various embodiments, each computation unit is configured to perform one or more multiply, add, accumulate, and/or shift operations. In some embodiments, each computation unit is configured to perform a dot-product operation. For example, in some embodiments, a computation unit may perform multiple dot-product component operations to calculate a dot-product result. For example, the array of computation units of matrix processor 107 may be utilized to perform convolution steps required for performing inference using a machine learning model. A two-dimensional data set, such as an image, may be formatted and fed into matrix processor 107 using data formatter 104, one vector at a time. In parallel, a filter of weights may be applied to the two-dimensional data set by formatting the weights and feeding them as a vector into matrix processor 107 using weight formatter 106. Corresponding computation units of matrix processor 107 perform a matrix processor instruction on the corresponding operands of the weight and data inputs in parallel.

In some embodiments, vector engine 111 is a vector computational unit that is communicatively coupled to matrix processor 107. Vector engine 111 includes a plurality of processing elements including processing element 113. In the figure shown, the small squares inside vector engine 111 depict that vector engine 111 includes a plurality of processing elements arranged as a vector. In some embodiments, the processing elements are arranged in a vector in the same direction as data formatter 104. In some embodiments, the processing elements are arranged in a vector in the same direction as weight formatter 106. In various embodiments, the data size of the processing elements of vector engine 111 is the same size or larger than the data size of the computation units of matrix processor 107. For example, in some embodiments, computation unit 109 receives two operands each 1 byte in size and outputs a result 4 bytes in size. Processing element 113 receives the 4-byte result from computation unit 109 as an input 4 bytes in size. In various embodiments, the output of vector engine 111 is the same size as the input to vector engine 111. In some embodiments, the output of vector engine 111 is smaller in size compared to the input to vector engine 111. For example, vector engine 111 may receive up to 96 elements each 4 bytes in size and output 96 elements each 1 byte in size. As described above, in some embodiments, the communication channel from data formatter 104 and weight formatter 106 to matrix processor 107 is 96-elements wide with each element 1 byte in size and matches the output size of vector engine 111 (96-elements wide with each element 1 byte in size).

In some embodiments, the processing elements of vector engine 111, including processing element 113, each include an arithmetic logic unit (ALU) (not shown). For example, in some embodiments, the ALU of each processing element is capable of performing arithmetic operations. In some embodiments, each ALU of the processing elements is capable of performing in parallel a rectified linear unit (ReLU) function and/or scaling functions. In some embodiments, each ALU is capable of performing a non-linear function including non-linear activation functions. In various embodiments, each processing element of vector engine 111 includes one or more flip-flops for receiving input operands. In some embodiments, each processing element has access to a slice of a vector engine accumulator and/or vector registers of vector engine 111. For example, a vector engine capable of receiving 96-elements includes a 96-element wide accumulator and one or more 96-element vector registers. Each processing element has access to a one-element slice of the accumulator and/or vector registers. In some embodiments, each element is 4-bytes in size. In various embodiments, the accumulator and/or vector registers are sized to fit at least the size of an input data vector. In some embodiments, vector engine 111 includes additional vector registers sized to fit the output of vector engine 111.

In some embodiments, the processing elements of vector engine 111 are configured to receive data from matrix processor 107 and each of the processing elements can process the received portion of data in parallel. As one example of a processing element, processing element 113 of vector engine 111 receives data from computation unit 109 of matrix processor 107. In various embodiments, vector engine 111 receives a single vector processor instruction and in turn each of the processing elements performs the processor instruction in parallel with the other processing elements. In some embodiments, the processor instruction includes one or more component instructions, such as a load, a store, and/or an arithmetic logic unit operation. In various embodiments, a no-op operation may be used to replace a component instruction.

In the example shown, the dotted arrows between data formatter 104 and matrix processor 107, weight formatter 106 and matrix processor 107, matrix processor 107 and vector engine 111, and vector engine 111 and post-processing unit 115 depict couplings between the respective pairs of components that are capable of sending multiple data elements such as a vector of data elements. As an example, the communication channel between matrix processor 107 and vector engine 111 may be 96×32 bits wide and support transferring 96 elements in parallel where each element is 32 bits in size. As another example, the communication channel between vector engine 111 and post-processing unit 115 may be 96×1 byte wide and support transferring 96 elements in parallel where each element is 1 byte in size. In various embodiments, input to data formatter 104 and weight formatter 106 are retrieved from memory 102 and/or cache 103. In some embodiments, vector engine 111 is additionally coupled to a memory module (not shown in FIG. 1) and may receive input data from the memory module in addition or alternatively to input from matrix processor 107. In the various embodiments, a memory module is typically a static random access memory (SRAM).

In some embodiments, one or more computation units of matrix processor 107 may be grouped together into a lane such that matrix processor 107 has multiple lanes. In various embodiments, the lanes of matrix processor 107 may be aligned with either data formatter 104 or weight formatter 106. For example, a lane aligned with weight formatter 106 includes a set of computation units that are configured to receive as input every operand of weight formatter 106. Similarly, a lane aligned with data formatter 104 includes a set of computation units that are configured to receive as input every operand of data formatter 104. In the example shown in FIG. 1, the lanes are aligned along weight formatter 106 in a vertical column and each lane feeds to a corresponding lane of vector engine 111. In some embodiments, each lane is a vertical column of sub-circuits that include multiply, add and/or accumulate, and shift functionality. In some embodiments, matrix processor 107 includes a matrix of tiles and each tile is a matrix of computation units. For example, a 96×96 matrix processor may include a matrix of 6×6 tiles, where each tile includes 16×16 computation units. In some embodiments, a vertical lane is a single column of tiles. In some embodiments, a horizontal lane is a single row of tiles. In various embodiments, the dimensions of the lane may be configured dynamically and may be utilized for performing alignment operations on the input to matrix processor 107, vector engine 111, and/or post-processing unit 115. In some embodiments, the dynamic configuration is performed by or using control unit 101 and/or with using processor instructions and/or control signals controlled by control unit 101.

In some embodiments, control unit 101 synchronizes the processing performed by data formatter 104, weight formatter 106, arbiter 123, matrix processor 107, vector engine 111, and post-processing unit 115. For example, control unit 101 may send processor specific control signals and/or instructions to each of data formatter 104, weight formatter 106, matrix processor 107, vector engine 111, and post-processing unit 115. In some embodiments, a control signal is utilized instead of a processor instruction. Control unit 101 may send matrix processor instructions to matrix processor 107. A matrix processor instruction may be a computational array instruction that instructs a computational array to perform an arithmetic operation, such as a dot-product or dot-product component, using specified operands retrieved from memory 102 and/or cache 103 that are formatted by data formatter 104 and/or weight formatter 106, respectively. Control unit 101 may send vector processor instructions to vector engine 111. For example, a vector processor instruction may include a single processor instruction with a plurality of component instructions to be executed together by the vector computational unit. Control unit 101 may send post-processing instructions to post-processing unit 115. In various embodiments, control unit 101 synchronizes data that is fed to matrix processor 107 from data formatter 104 and weight formatter 106, to vector engine 111 from matrix processor 107, and to post-processing unit 115 from vector engine 111. In some embodiments, control unit 101 synchronizes the data between different components of microprocessor system 100 including between data formatter 104, weight formatter 106, matrix processor 107, vector engine 111, and/or post-processing unit 115 by utilizing processor specific memory, queue, and/or dequeue operations and/or control signals. In some embodiments, data and instruction synchronization is performed by control unit 101. In some embodiments, data and instruction synchronization is performed by control unit 101 that includes one or more sequencers to synchronize processing between data formatter 104, weight formatter 106, matrix processor 107, vector engine 111, and/or post-processing unit 115. In some embodiments, data and instruction synchronization is performed by using arbiter 123 to initiate the dequeueing of a control operation queued at control queue 121 to synchronize the arrival of operands at matrix processor 107 via data formatter 103 and weight formatter 106 with the arrival of the corresponding control operation.

In some embodiments, data formatter 104, weight formatter 106, matrix processor 107, and vector engine 111 are utilized for processing convolution layers. For example, matrix processor 107 may be used to perform calculations associated with one or more convolution layers of a convolution neural network. Data formatter 104 and weight formatter 106 may be utilized to prepare matrix and/or vector data in a format for processing by matrix processor 107. Memory 102 may store image data such as one or more image channels captured by sensors (not shown), where sensors include, as an example, cameras mounted to a vehicle. Memory 102 may store weights determined by training a machine learning model for autonomous driving. In some embodiments, vector engine 111 is utilized for performing non-linear functions such as an activation function on the output of matrix processor 107. For example, matrix processor 107 may be used to calculate a dot-product and vector engine 111 may be used to perform an activation function such as a rectified linear unit (ReLU) or sigmoid function. In some embodiments, post-processing unit 115 is utilized for performing pooling operations. In some embodiments, post-processing unit 115 is utilized for formatting and storing the processed data to memory and may be utilized for synchronizing memory writing latency.

Figure 2:
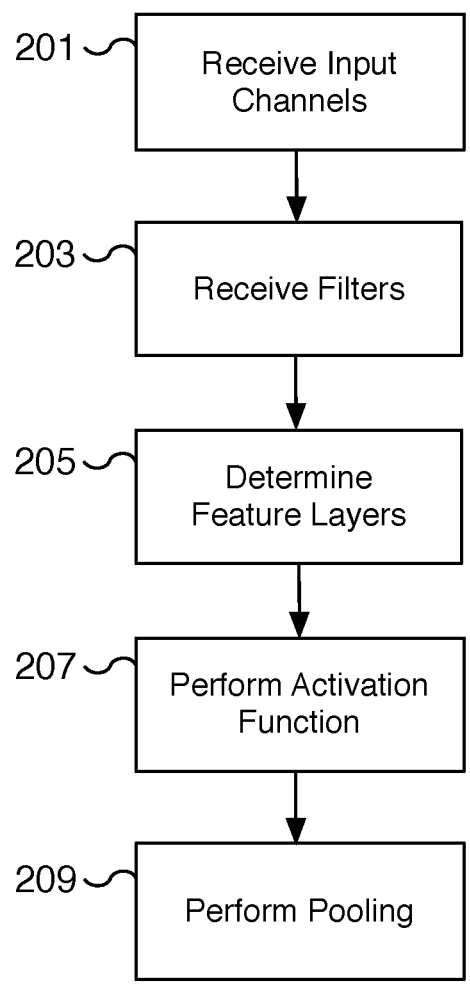
FIG. 2 is a flow diagram illustrating an embodiment of a process for performing machine learning processing.

FIG. 2 is a flow diagram illustrating an embodiment of a process for performing machine learning processing. In some embodiments, the process of FIG. 2 is utilized to implement a convolutional neural network using sensor input data such as images and learned weights. In various embodiments, the process of FIG. 2 may be repeated for multiple convolution layers by using the output of the process of FIG. 2 as the input for the next convolution layer. In some embodiments, the processing is performed in the context of self-driving or driver-assisted vehicles to identify objects in a scene such as street signs, vehicles, pedestrians, and lane markers, among other objects. Other sensor data, including non-image sensor data, such as ultrasonic, radar, and LiDAR, may also be utilized as input data. In various embodiments, the process of FIG. 2 utilizes a microprocessor system such as is microprocessor system 100 of FIG. 1.

At 201, input channels are received as input data to the microprocessor system. For example, vision data is captured using sensors and may include one or more channels corresponding to different color channels for the colors red, green, and blue. In various embodiments, multiple channels may be utilized as the different channels may contain different forms of information. As another example, non-sensor data may be utilized as input data. In various embodiments, the input channels may be loaded from memory via a cache using subsets of consecutively stored data in memory. In some embodiments, the input channels may be retrieved and/or formatted for processing using a hardware data formatter such as data formatter 104 of FIG. 1.

At 203, one or more filters are received for processing the input channels. For example, a filter in the form of a matrix contains learned weights and is used to identify activations in the channels. In some embodiments, the filter is a square matrix kernel smaller than the input channel. In various embodiments, filters may be utilized to identify particular shapes, edges, lines, and other features and/or activations in the input data. In some embodiments, the filters and associated weights that make up the filter are created by training a machine learning model using a training corpus of data similar to the input data. In various embodiments, the received filters may be streamed from memory. In some embodiments, the filters may be retrieved and/or formatted for processing using a hardware data formatter such as weight formatter 106 of FIG. 1.

At 205, one or more feature layers are determined using the received input channels and filters. In various embodiments, the feature layers are determined by performing one or more convolution operations using a computational array such as matrix processor 107 of FIG. 1. In some embodiments, the one or more output feature layers are determined by repeatedly performing a dot-product between different small regions of an input channel and the weights of the filter. In various embodiments, each filter is used to create a single feature layer by performing a two-dimensional convolution using the filter. In some embodiments, the input data is padded to adjust for the size of the output feature layer. In various embodiments, a stride parameter is utilized and may impact the size of the output feature layer. In various embodiments, a bias parameter may be utilized. For example, a bias term may be added to the resulting values of convolution for each element of a feature layer.

At 207, an activation function is performed on one or more feature layers. For example, an element-wise activation function, such as a rectified linear unit (ReLU) function, is performed using a vector processor such as vector engine 111 of FIG. 1 to create an activation layer. In various embodiments, different activation functions, such as a non-linear activation function, including ReLU and sigmoid, may be utilized to create an activation layer for each feature layer.

At 209, pooling is performed on the activation layers created at 207. For example, a pooling layer is generated by a post-processing unit such as post-processing unit 115 of FIG. 1 using the activation layer generated at 207. In some embodiments, the pooling layer is generated to down sample the activation layer. In various embodiments, different filter sizes may be utilized to create a pooling layer based on the desired output size. In various embodiments, different pooling techniques, such as maxpooling, are utilized. In various embodiments, pooling parameters include kernel size, stride, and/or spatial extent, among others. In some embodiments, the pooling layer is an optional layer and may be implemented when appropriate.

In various embodiments, the process of FIG. 2 is utilized for each layer of a convolution neural network (CNN). Multiple passes of the process of FIG. 2 may be utilized to implement a multi-layer CNN. For example, the output of 209 may be utilized as input channels at 201 to calculate output layers of an intermediate layer. In some embodiments, a CNN is connected to one or more additional non-CNN layers for classification, object detection, object segmentation, and/or other appropriate goals. In some embodiments, the additional non-CNN layers are implemented using a microprocessor system such as is microprocessor system 100 of FIG. 1.

Figure 3:
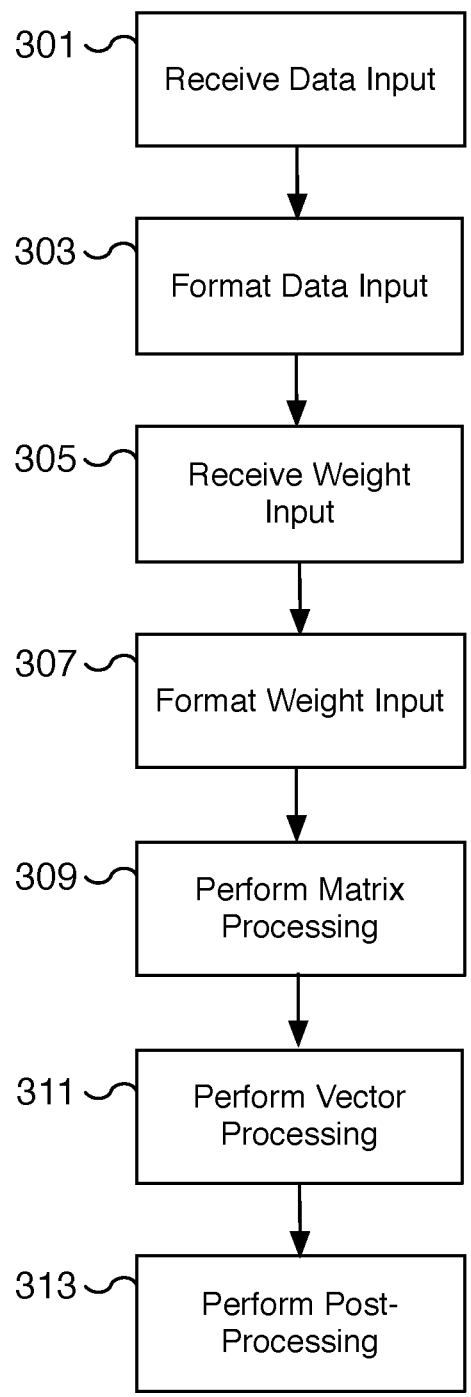
FIG. 3 is a flow diagram illustrating an embodiment of a process for performing machine learning processing.

FIG. 3 is a flow diagram illustrating an embodiment of a process for performing machine learning processing. In some embodiments, the process of FIG. 3 is utilized to perform inference on sensor data by performing computational operations, such as convolution operations, and element-wise activation functions. In some embodiments, the process of FIG. 3 is performed using a microprocessor system such as is microprocessor system 100 of FIG. 1. In various embodiments, steps 301 and 303 are performed at 201 of FIG. 2 using at least data formatter 104 of FIG. 1, steps 305 and 307 are performed at 203 of FIG. 2 using at least weight formatter 106 of FIG. 1, step 309 is performed at 205 of FIG. 2 using at least matrix processor 107 of FIG. 1, step 311 is performed at 207 of FIG. 2 using at least vector engine 111 of FIG. 1, and step 313 is performed at 209 of FIG. 2 using at least post-processing unit 115 of FIG. 1.

At 301, data input is received. For example, data input corresponding to sensor data is received by a hardware data formatter for formatting. In some embodiments, data input is retrieved from memory 102 of FIG. 1 and is received by data formatter 104 of FIG. 1. In various embodiments, a hardware data formatter requests the data input from memory as read requests based on subsets of values stored consecutively in memory. For example, a hardware data formatter may first check a cache of the memory for the requested data values and in the event of a cache miss, the read request will retrieve the data values from memory. In various embodiments, checking for a cache hit or miss requires calculating the start address and end address of the subset of requested data values. In some embodiments, a data request populates the cache with the requested values along with additional data to fill a cache line. In some embodiments, the data is streamed in from memory and may bypass the cache.

At 303, data input is formatted using a hardware data formatter. For example, a hardware data formatter such as data formatter 104 of FIG. 1 formats the received data input for processing by a computational array such as matrix processor 107 of FIG. 1. The hardware data formatter may format the received data input into an input vector of operands for a computational array. In some embodiments, the hardware data formatter further performed the requesting of data received at 301. In some embodiments, the hardware data formatter will format at least one of the operands of a convolution operation. For example, each two-dimensional region corresponding to an input channel of vision data for a convolution operation involving a filter will be formatted by the hardware data formatter into a vector operand for the computational array. The vectors corresponding to the regions are grouped together by their n-th elements and fed to the computation array at a rate of at most one element from each vector per clock cycle. In some embodiments, the hardware data formatter will select the appropriate elements for performing convolution of a filter with the data input by formatting each region of the data input into a vector and feeding each element of the appropriate vector to a corresponding computation unit of a computational array. In some embodiments, a bias parameter is introduced using the hardware data formatter.

At 305, weight input is received. For example, weight input corresponding to machine learning weights of a filter are received by a hardware data formatter for formatting. In some embodiments, weight input is retrieved from memory 102 of FIG. 1 and is received by weight formatter 106 of FIG. 1. In various embodiments, a hardware data formatter requests the weight input from memory as read requests based on subsets of values stored consecutively in memory. For example, a hardware data formatter may first check a cache of the memory for the requested weight values and in the event of a cache miss, the read request will retrieve the weight values from memory. In various embodiments, checking for a cache hit or miss requires calculating the start address and end address of the subset of requested weight values. In some embodiments, a weight data request populates the cache with the requested weight values. In some embodiments, the data for weights is streamed in from memory and may bypass the cache. In some embodiments, the weight input includes a bias parameter.

At 307, weight input is formatted using a hardware data formatter. For example, a hardware data formatter such as weight formatter 106 of FIG. 1 formats the received weight input for processing by a computational array such as matrix processor 107 of FIG. 1. The hardware data formatter may format the received weight input into an input vector of operands for a computational array. In some embodiments, the hardware data formatter further performed the requesting of data received at 305. In some embodiments, the hardware data formatter will format at least one of the operands of a convolution operation. For example, a filter for a convolution operation will be formatted by the hardware data formatter into a vector operand for the computational array. In some embodiments, the hardware data formatter will select the appropriate elements for performing convolution of a filter with the data input by formatting the filter into a vector and feeding each element of the vector to a corresponding computation unit of a computational array. In some embodiments, a bias parameter is introduced using the hardware data formatter.

At 309, matrix processing is performed. For example, the operands formatted at 303 and 307 are received by each of the computation units of a computational array for processing. In some embodiments, the matrix processing is performed using a matrix processor such as matrix processor 107 of FIG. 1. In some embodiments, a dot-product is performed at each appropriate computation unit of the computational array using respective vectors received by hardware data formatters such as data formatter 104 and weight formatter 106 of FIG. 1. In some embodiments, only a subset of the matrix processor's computation units is utilized. For example, a computational array with 96×96 computation units may utilize only 64×64 computation units in the event the data input is 64 vectors and the weight input is 64 vectors. In various embodiments, the number of computation units utilized is based on the size on the data input and/or weight input. In some embodiments, the computation units each perform one or more of multiply, add, accumulate, and/or shift operations. In some embodiments, the computation units each perform one or more of multiply, add, accumulate, and/or shift operations each clock cycle. In some embodiments, a bias parameter is received and added to the calculated dot-product as part of the matrix processing performed.

At 311, vector processing is performed. For example, an element-wise activation function may be performed on the result of the matrix processing performed at 309. In some embodiments, an activation function is a non-linear activation function such as a rectified linear unit (ReLU), sigmoid, or other appropriate function. In some embodiments, the vector processor is utilized to implement scaling, normalization, or other appropriate techniques. For example, a bias parameter may be introduced to the result of a dot-product using the vector processor. In some embodiments, the result of 311 is a series of activation maps or activation layers. In some embodiments, vector processing is performed using a vector engine such as vector engine 111 of FIG. 1.

At 313, post-processing is performed. For example, a pooling layer may be implemented using a post-processing processor such as post-processing unit 115 of FIG. 1. In various embodiments, different post-processing techniques, including different pooling techniques such as maxpooling, may be implemented during the post-processing stage of 313.

In various embodiments, the process of FIG. 3 is utilized for each layer of a convolution neural network (CNN). Multiple passes of the process of FIG. 3 may be utilized to implement a multi-layer CNN. For example, the output of 313 may be utilized as data input for step 301. In some embodiments, the process of FIG. 3 must be repeated one or more times to complete a single layer. For example, in the scenario where the sensor data is larger in dimension than the number of computation units of the computational array, the sensor data may be sliced into smaller regions that fit the computational array and the process of FIG. 3 is repeated on each of the sliced regions.

Figure 4:
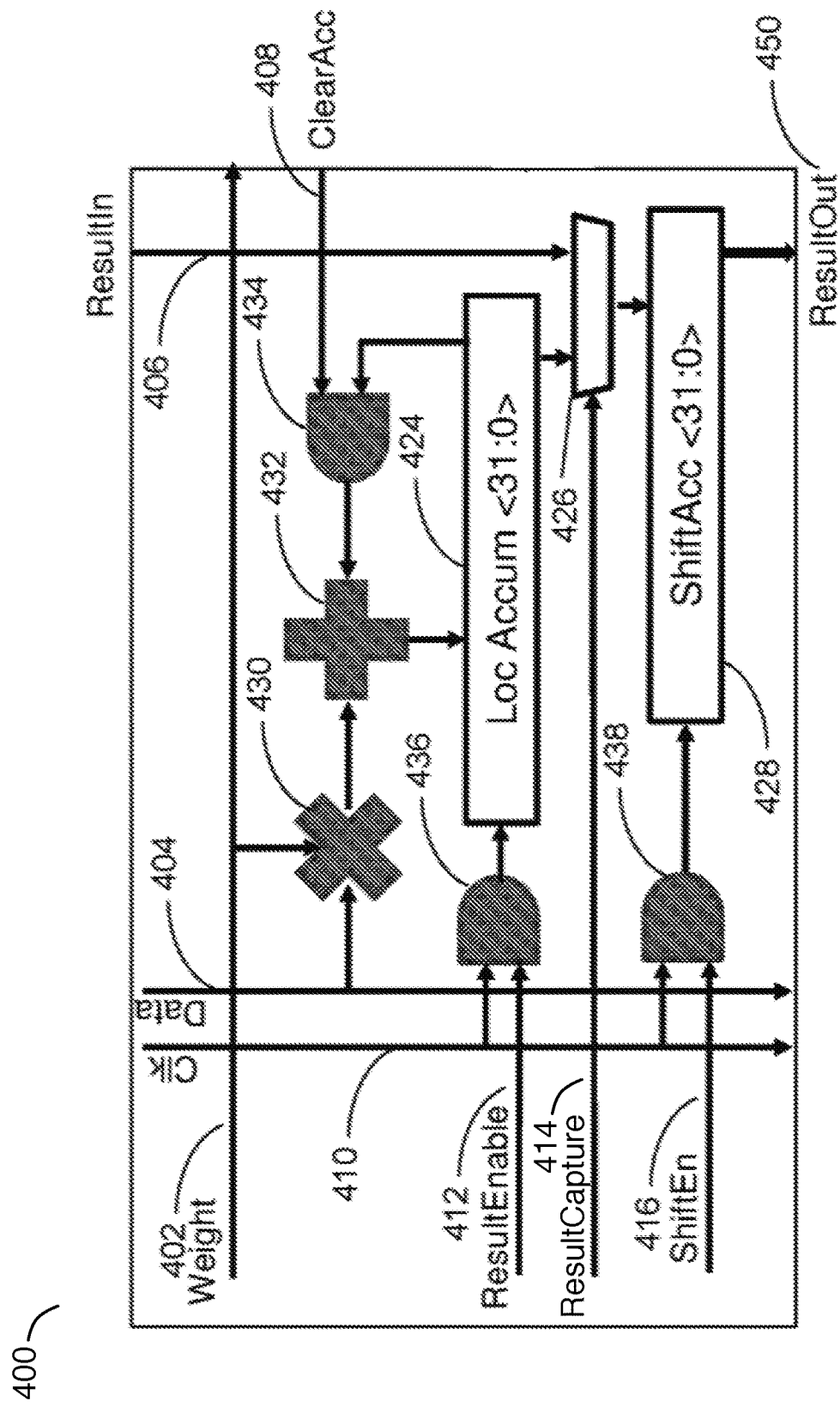
FIG. 4 is a block diagram illustrating an embodiment of a computation unit of a computational array.

FIG. 4 is a block diagram illustrating an embodiment of a computation unit of a computational array. In the example shown, computation unit 400 includes input values weight 402, data 404, and ResultIn 406; signals ClearAcc signal 408, Clock signal 410, ResultEnable signal 412, ResultCapture signal 414, and ShiftEn signal 416; components accumulator 424, multiplexer 426, shadow register 428, multiplier 430, and adder 432; logic 434, 436, and 438; and output value ResultOut 450. In some embodiments, logic 434, 436, and 438 are AND gates. In some embodiments, additional signals are included as appropriate. In various embodiments, the computation unit of FIG. 4 is repeated for each of the plurality of computation units, such as computation unit 109, of a computation array such as matrix processor 107 of FIG. 1. Computation unit 400 may be utilized to implement computational operations in parallel. In various embodiments, each computation unit of a computational array performs computations in parallel with the other computation units. In various embodiments, computation unit 400 is a sub-circuit of a matrix processor that includes the functionality for performing one or more multiply, add, accumulate, and/or shift operations. For example, computation unit 400 may be a sub-circuit that includes the functionality for performing a dot-product operation.

In some embodiments, Clock signal 410 is a clock signal received by computation unit 400. In various embodiments, each computation unit of the computational array receives the same clock signal and the clock signal is utilized to synchronize the processing of each computation unit with the other computation units.

In the example shown, multiplier 430 receives and performs a multiplication operation on the input values data 404 and weight 402. The output of multiplier 430 is fed to adder 432. Adder 432 receives and performs an addition on the output of multiplier 430 and the output of logic 434. The output of adder 432 is fed to accumulator 424. In some embodiments, input values data 404 and weight 402 are lines that cross computation units and feed the corresponding data and/or weight to neighboring computation units. For example, in some embodiments, data 404 is fed to all computation units in the same column and weight 402 is fed to all computation units in the same row. In various embodiments, data 404 and weight 402 correspond to input elements fed to computation unit 400 from a data hardware data formatter and a weight hardware data formatter, respectively. In some embodiments, the data hardware data formatter and the weight hardware data formatter are data formatter 104 and weight formatter 106 of FIG. 1, respectively.

In some embodiments, ClearAcc signal 408 clears the contents of accumulator 424. As an example, accumulation operations can be reset by clearing accumulator 424 and used to accumulate the result of multiplier 430. In some embodiments, ClearAcc signal 408 is used to clear accumulator 424 for performing a new dot-product operation. For example, elements-wise multiplications are performed by multiplier 430 and the partial-dot-product results are added using adder 432 and accumulator 424.

In various embodiments, accumulator 424 is an accumulator capable of accumulating the result of adder 432 and indirectly the result of multiplier 430. For example, in some embodiments, accumulator 424 is configured to accumulate the result of multiplier 430 with the contents of accumulator 424 based on the status of ClearAcc signal 408. As another example, based on the status of ClearAcc signal 408, the current result stored in accumulator 424 may be ignored by adder 432. In the example shown, accumulator 424 is a 32-bit wide accumulator. In various embodiments, accumulator 424 may be sized differently, e.g., 8-bits, 16-bits, 64-bits, etc., as appropriate. In various embodiments, each accumulator of the plurality of computation units of a computational array is the same size. In various embodiments, accumulator 424 may accumulate and save data, accumulate and clear data, or just clear data. In some embodiments, accumulator 424 may be implemented as an accumulation register. In some embodiments, accumulator 424 may include a set of arithmetic logic units (ALUs) that include registers.

In some embodiments, ResultEnable signal 412 is activated in response to a determination that data 404 is valid. For example, ResultEnable signal 412 may be enabled to enable processing by a computation unit such as processing by multiplier 430 and adder 432 into accumulator 424.

In some embodiments, ResultCapture signal 414 is utilized to determine the functionality of multiplexer 426. Multiplexer 426 receives as input ResultIn 406, output of accumulator 424, and ResultCapture signal 414. In various embodiments, ResultCapture signal 414 is used to enable either ResultIn 406 or the output of accumulator 424 to pass through as the output of multiplexer 426. In some embodiments, multiplexer 426 is implemented as an output register. In some embodiments, ResultIn 406 is connected to a computation unit in the same column as computation unit 400. For example, the output of a neighboring computation unit is fed in as an input value ResultIn 406 to computation unit 400. In some embodiments, the input of a neighboring computation unit is the computation unit's corresponding ResultOut value.

In some embodiments, shadow register 428 receives as input the output of multiplexer 426. In some embodiments, shadow register 428 is configured to receive the output of accumulator 424 via multiplexer 426 depending on the value of ResultCapture signal 414. In the example shown, the output of shadow register 428 is output value ResultOut 450. In various embodiments, once a result is inserted into shadow register 428, accumulator 424 may be used to commence new calculations. For example, once the final dot-product result is stored in shadow register 428, accumulator 424 may be cleared and used to accumulate and store the partial result and eventually the final result of a new dot-product operation on new weight and data input values. In the example shown, shadow register 428 receives a signal ShiftEn signal 416. In various embodiments, ShiftEn signal 416 is used to enable or disable the storing of values in the shadow register 428. In some embodiments, ShiftEn signal 416 is used to shift the value stored in shadow register 428 to output value ResultOut 450. For example, when ShiftEn signal 416 is enabled, the value stored in shadow register 428 is shifted out of shadow register 428 as output value ResultOut 450. In some embodiments, ResultOut 450 is connected to a neighboring computation unit's input value ResultIn. In some embodiments, the last cell of a column of computation units is connected to the output of the computational array. In various embodiments, the output of the computational array feeds into a vector engine such as vector engine 111 of FIG. 1 for vector processing. For example, the output ResultOut 450 of a computation cell such as computation cell 109 of FIG. 1 may be fed into a processing element of a vector engine such as processing element 113 of vector engine 111 of FIG. 1.

In the example shown, shadow register 428 is 32-bits wide. In various embodiments, shadow register 428 may be sized differently, e.g., 8-bits, 16-bits, 64-bits, etc., as appropriate. In various embodiments, each shadow register of the plurality of computation units of a computational array is the same size. In various embodiments, shadow register 428 is the same size as accumulator 424. In various embodiments, the size of multiplexer 426 is based on the size of accumulator 424 and/or shadow register 428 (e.g., the same size or larger).

In some embodiments, logic 434, 436, and 438 receive signals, such as control signals, to enable and/or configure the functionality of computation unit 400. In various embodiments, logic 434, 436, and 438 are implemented using AND gates and/or functionality corresponding to an AND gate. For example, as described above, logic 434 receives ClearAcc signal 408 and an input value corresponding to the value stored in accumulator 424. Based on ClearAcc signal 408, the output of logic 434 is determined and fed to adder 432. As another example, logic 436 receives ResultEnable signal 412 and Clock signal 410. Based on ResultEnable signal 412, the output of logic 436 is determined and fed to accumulator 424. As another example, logic 438 receives ShiftEn signal 416 and Clock signal 410. Based on ShiftEn signal 416, the output of logic 438 is determined and fed to shadow register 428.

In various embodiments, computation units may perform a multiplication, an addition operation, and a shift operation at the same time, i.e., within a single cycle, thereby doubling the total number of operations that occur each cycle. In some embodiments, results are moved from multiplexer 426 to shadow register 428 in a single clock cycle, i.e., without the need of intermediate execute and save operations. In various embodiments, the clock cycle is based on the signal received at Clock signal 410.

In various embodiments, input values weight 402 and data 404 are 8-bit values. In some embodiments, weight 402 is a signed value and data 404 is unsigned. In various embodiments, weight 402 and data 404 may be signed or unsigned, as appropriate. In some embodiments, ResultIn 406 and ResultOut 450 are 32-bit values. In various embodiments ResultIn 406 and ResultOut 450 are implemented using a larger number of bits than input operands weight 402 and data 404. By utilizing a large number of bits, the results of multiplying multiple pairs of weight 402 and data 404, for example, to calculate a dot-product result, may be accumulated without overflowing the scalar result.

In some embodiments, computation unit 400 generates an intermediate and/or final computation result in accumulator 424. The final computation result is then stored in shadow register 428 via multiplexer 426. In some embodiments, multiplexer 426 functions as an output register and store the output of accumulator 424. In various embodiments, the final computation result is the result of a convolution operation. For example, the final result at ResultOut 450 is the result of convolution between a filter received by computation unit 400 as input values using weight 402 and a two-dimensional region of sensor data received by computation unit 400 as input values using data 404.

As an example, a convolution operation may be performed using computation unit 400 on a 2×2 data input matrix [d0 d1; d2 d3] corresponding to a region of sensor data and a filter corresponding to a 2×2 matrix of weights [w0 w1; w2 w3]. The 2×2 data input matrix has a first row [d0 d1] and a second row [d2 d3]. The filter matrix has a first row [w0 w1] and a second row [w2 w3]. In various embodiments, computation unit 400 receives the data matrix via data 404 as a one-dimensional input vector [d0 d1 d2 d3] one element per clock cycle and weight matrix via weight 402 as a one-dimensional input vector [w0 w1 w2 w3] one element per clock cycle. Using computation unit 400, the dot product of the two input vectors is performed to produce a scalar result at ResultOut 450. For example, multiplier 430 is used to multiply each corresponding element of the input weight and data vectors and the results are stored and added to previous results in accumulator 424. For example, the result of element d0 multiplied by element w0 (e.g., d0*w0) is first stored in cleared accumulator 424. Next, element d1 is multiplied by element w1 and added using adder 432 to the previous result stored in accumulator 424 (e.g., d0*w0) to compute the equivalent of d0*w0+d1*w1. Processing continues to the third pair of elements d2 and w2 to compute the equivalent of d0*w0+d1*w1+d2*w2 at accumulator 424. The last pair of elements is multiplied and the final result of the dot product is now stored in accumulator 424 (e.g., d0*w0+d1*w1+d2*w2+d3*w3). The dot-product result is then copied to shadow register 428. Once stored in shadow register 428, a new dot-product operation may be initiated, for example, using a different region of sensor data. Based on ShiftEn signal 416, the dot-product result stored in shadow register 428 is shifted out of shadow register 428 to ResultOut 450. In various embodiments, the weight and data matrices may be different dimensions than the example above. For example, larger dimensions may be used.

In some embodiments, a bias parameter is introduced and added to the dot-product result using accumulator 424. In some embodiments, the bias parameter is received as input at either weight 402 or data 404 along with a multiplication identity element as the other input value. The bias parameter is multiplied against the identity element to preserve the bias parameter and the multiplication result (e.g., the bias parameter) is added to the dot-product result using adder 432. The addition result, a dot-product result offset by a bias value, is stored in accumulator 424 and later shifted out at ResultOut 450 using shadow register 428. In some embodiments, a bias is introduced using a vector engine such as vector engine 111 of FIG. 1.

Figure 5:
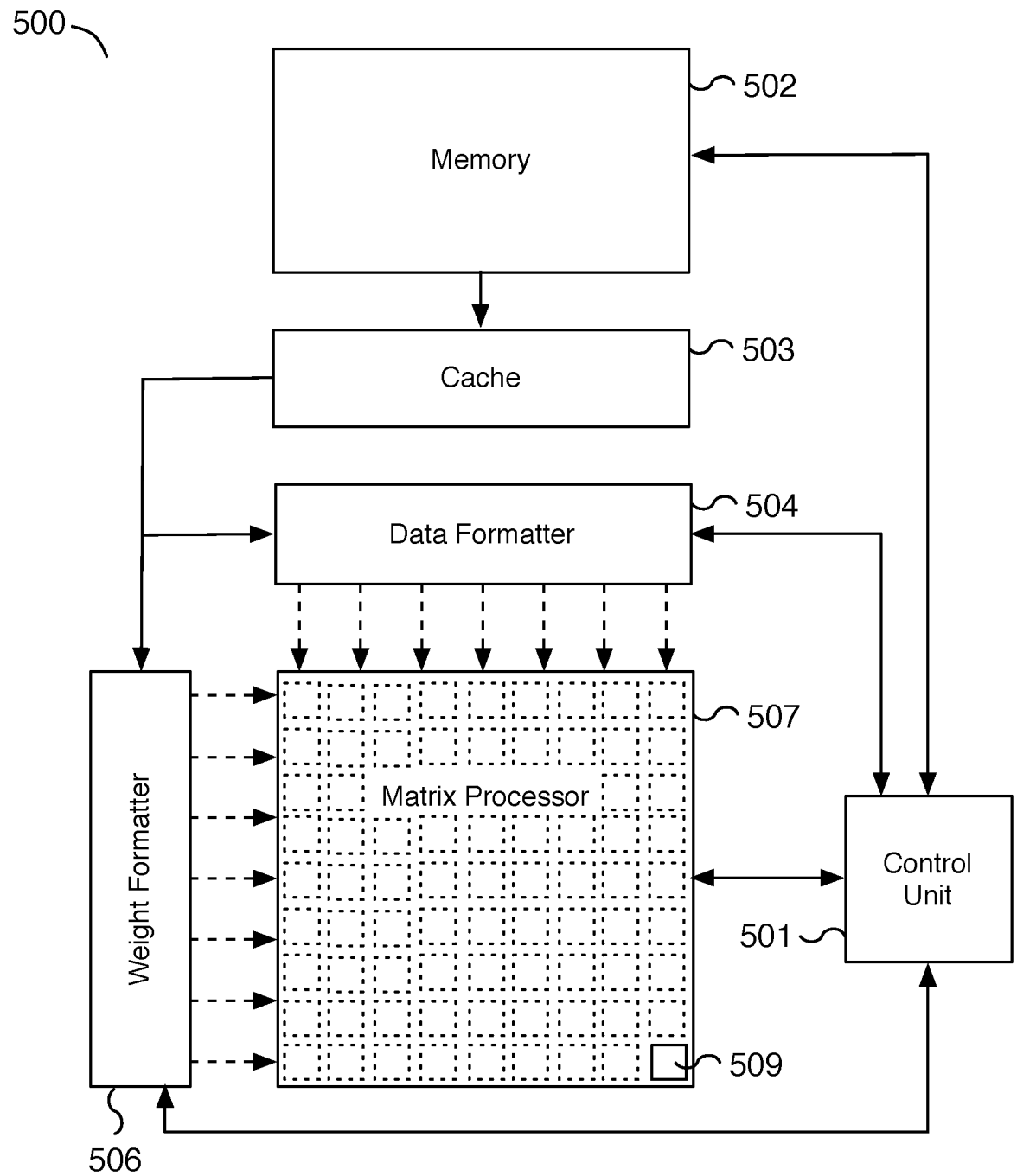
FIG. 5 is a block diagram illustrating an embodiment of a cache-enabled microprocessor system for performing machine learning processing.

FIG. 5 is a block diagram illustrating an embodiment of a cache-enabled microprocessor system for performing machine learning processing. The microprocessor system of FIG. 5 includes hardware data formatters that interface with a cache to prepare input values for a computational array such as a matrix processor. In various embodiments, incorporating a memory cache and using hardware data formatters to populate the cache increases the throughput of the matrix processor and allows the microprocessor system to operate at a higher clock rate than would otherwise be allowed. In the example shown, microprocessor system 500 includes control unit 501, memory 502, cache 503, data formatter 504, weight formatter 506, and matrix processor 507. Input data and weight data are retrieved by hardware data formatters 504, 506 from memory 502 via cache 503. The retrieved input values are formatted using data formatter 504 and weight formatter 506 to prepare vector operands for matrix processor 507. In some embodiments, data formatter 504 and weight formatter 506 include a logic circuit for preparing data for matrix processor 507 and/or a memory cache or buffer for storing and processing input data. For example, data formatter 504 may prepare N operands from a two-dimensional array retrieved from memory 502 via cache 503. Weight formatter 506 may prepare M operands retrieved from memory 502 via cache 503 that correspond to weight values. Data formatter 504 and weight formatter 506 prepare the N and M operands to be processed by matrix processor 507.

In various embodiments, microprocessor system 500 is microprocessor system 100 of FIG. 1 depicted with a memory and memory cache. With respect to microprocessor 100 of FIG. 1, in various embodiments, control unit 501 is control unit 101, data formatter 504 is data formatter 104, weight formatter 506 is weight formatter 106, and matrix processor 507 is matrix processor 107 of FIG. 1. Further, with respect to microprocessor 100 of FIG. 1, in various embodiments, memory 502 and cache 503 are memory 102 and cache 103 of FIG. 1. In some embodiments, microprocessor system 500, including at least hardware data formatter 504, weight formatter 506, and matrix processor 507, performs the processes described with respect to FIGS. 7 and 8 and portions of processes described with respect to FIGS. 2 and 3.

In some embodiments, matrix processor 507 is a computational array that includes a plurality of computation units. For example, a matrix processor receiving M operands and N operands from weight formatter 506 and data formatter 504, respectively, includes M×N computation units. In the figure shown, the small squares inside matrix processor 507 depict that matrix processor 507 includes a logical two-dimensional array of computation units. Computation unit 509 is one of a plurality of computation units of matrix processor 507. In some embodiments, each computation unit is configured to receive one operand from data formatter 504 and one operand from weight formatter 506. Matrix processor 507 and computation unit 509 are described in further detail with respect to matrix processor 107 and computation unit 109, respectively, of FIG. 1. Input values to matrix processor 507 are received from data formatter 504 and weight formatter 506 and described in further detail with respect to inputs from data formatter 104 and weight formatter 106 to matrix processor 107 of FIG. 1.

In the example shown, the dotted arrows between data formatter 504 and matrix processor 507 and between weight formatter 506 and matrix processor 507 depict a coupling between the respective pairs of components that are capable of sending multiple data elements such as a vector of data elements. In various embodiments, the data width of components data formatter 504, weight formatter 506, and matrix processor 507 are wide data widths and include the ability to transfer more than one operand in parallel. The data widths of components data formatter 504, weight formatter 506, and matrix processor 507 are described in further detail with respect to corresponding components data formatter 104, weight formatter 106, and matrix processor 107 of FIG. 1.

In various embodiments, the arrows in FIG. 5 describe the direction data and/or control signals flow from component to component. In some embodiments, the connections depicted by the one-direction arrows in FIG. 5 (e.g., between data formatter 504 and cache 503, between weight formatter 506 and cache 503, and between cache 503 and memory 502) may be bi-directional and thus the data and/or control signals may flow in both directions. For example, in some embodiments, control signals, such as a read request and/or data, can flow from cache 503 to memory 502.

In various embodiments, memory 502 is typically static random access memory (SRAM). In some embodiments, memory 502 has a single read port or a limited number of read ports. In some embodiments, the amount of memory 502 dedicated to storing data (e.g., sensor data, image data, etc.), weights (e.g., weight associated with image filters, etc.), and/or other data may be dynamically allocated. For example, memory 502 may be configured to partition more or less memory for data input compared to weight input based on a particular workload. In some embodiments, cache 503 includes one or more cache lines. For example, in some embodiments, cache 503 is a 1 KB cache that includes four cache lines where each cache line is 256 bytes. In various embodiments, the size of the cache may be larger or small, with fewer or more cache lines, have larger or smaller cache lines, and may be determined based on expected computation workload.

In various embodiments, hardware data formatters (e.g., data formatter 504 and weight formatter 506) calculate memory addresses to retrieve input values from memory 502 and cache 503 for processing by matrix processor 507. In some embodiments, data formatter 504 and/or weight formatter 506 stream data corresponding to a subset of values stored consecutively in memory 502 and/or cache 503. Data formatter 504 and/or weight formatter 506 may retrieve one or more subsets of values stored consecutively in memory and prepare the data as input values for matrix processor 507. In various embodiments, the one or more subsets of values are not themselves stored consecutively in memory with other subsets. In some embodiments, memory 502 contains a single read port. In some embodiments, memory 502 contains a limited number of read ports and the number of read ports is fewer than the data width of components data formatter 504, weight formatter 506, and matrix processor 507. In some embodiments, hardware data formatters 504, 506 will perform a cache check to determine whether a subset of values is in cache 503 prior to issuing a read request to memory 502. In the event the subset of values is cached, hardware data formatters 504, 506 will retrieve the data from cache 503. In various embodiments, in the event of a cache miss, hardware data formatters 504, 506 will retrieve the entire subset of values from memory 502 and populate a cache line of cache 503 with the retrieved values.

In some embodiments, control unit 501 initiates and synchronizes processing between components of microprocessor system 500, including components memory 502, data formatter 504, weight formatter 506, and matrix processor 507. In some embodiments, control unit 501 coordinates access to memory 502 including the issuance of read requests. In some embodiments, control unit 501 interfaces with memory 502 to initiate read requests. In various embodiments, the read requests are initiated by hardware data formatters 504, 506 via the control unit 501. In various embodiments, control unit 501 synchronizes data that is fed to matrix processor 507 from data formatter 504 and weight formatter 506. In some embodiments, control unit 501 synchronizes the data between different components of microprocessor system 500 including between data formatter 504, weight formatter 506, and matrix processor 507, by utilizing processor specific memory, queue, and/or dequeue operations and/or control signals. Additional functionality performed by control unit 501 is described in further detail with respect to control unit 101 of FIG. 1.

In some embodiments, microprocessor system 500 is utilized for performing convolution operations. For example, matrix processor 507 may be used to perform calculations, including dot-product operations, associated with one or more convolution layers of a convolution neural network. Data formatter 504 and weight formatter 506 may be utilized to prepare matrix and/or vector data in a format for processing by matrix processor 507. Memory 502 may be utilized to store data such as one or more image channels captured by sensors (not shown). Memory 502 may also include weights, including weights in the context of convolution filters, determined by training a machine learning model for autonomous driving.

In various embodiments, microprocessor system 500 may include additional components (not shown in FIG. 5), including processing components, such as a vector processor and a post-processing unit. An example of a vector processor and its associated functionality is vector engine 111 of FIG. 1. An example of a post-processing unit and its associated functionality is post-processing unit 115 of FIG. 1.

Figure 6:
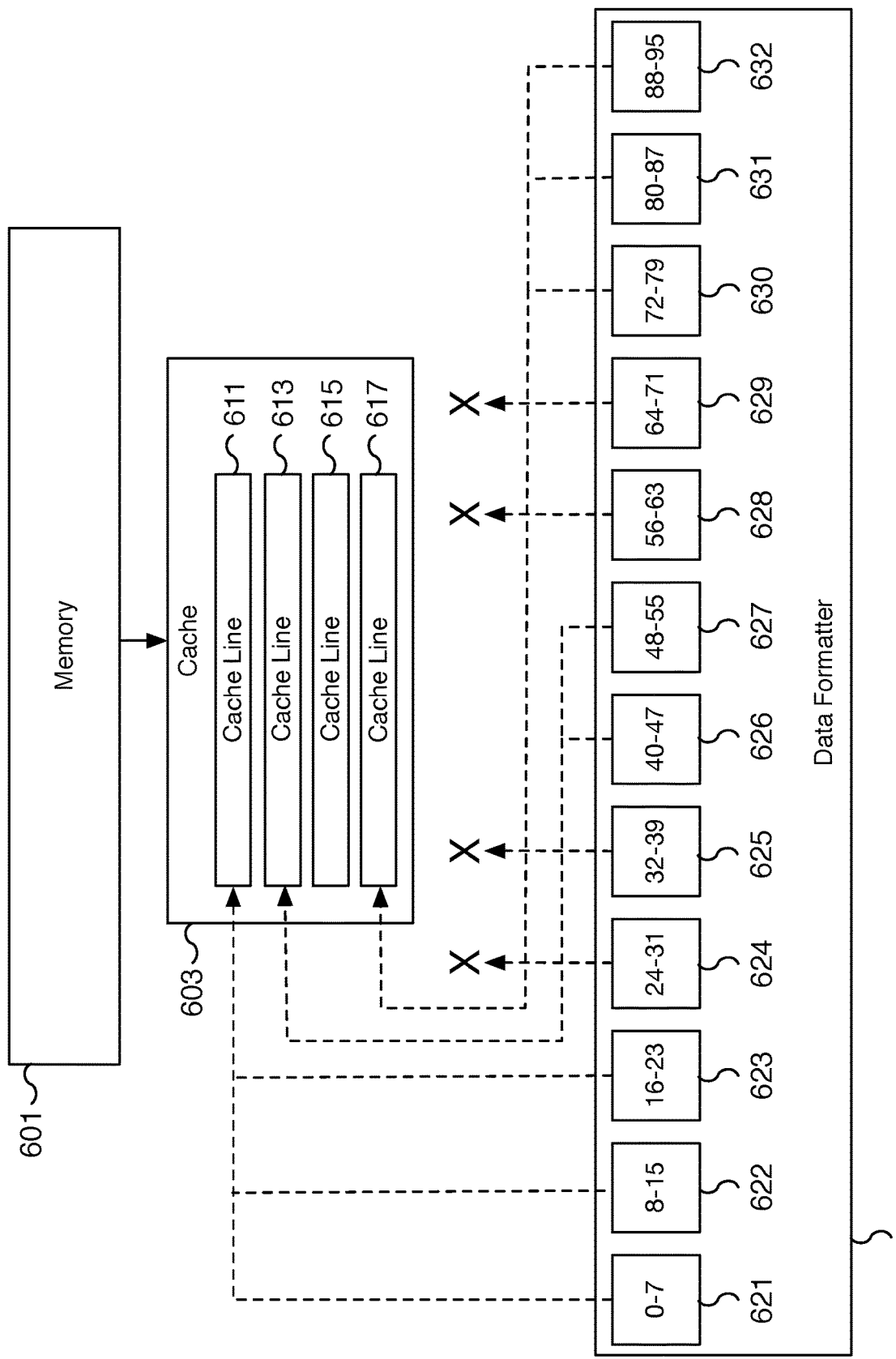
FIG. 6 is a block diagram illustrating an embodiment of a hardware data formatter, cache, and memory components of a microprocessor system.

FIG. 6 is a block diagram illustrating an embodiment of a hardware data formatter, cache, and memory components of a microprocessor system. In the example shown, the components include memory 601, cache 603, and hardware data formatter 605. Memory 601 is communicatively connected to cache 603 and cache 603 is communicatively connected to hardware data formatter 605. Cache 603 includes four cache lines 611, 613, 615, and 617. Hardware data formatter 605 includes twelve read buffers 621-632. Read buffers 621-632 are each 8-byte read buffers. In various embodiments, the number of and size of the read buffers may be fewer or more than depicted in the embodiment of FIG. 6. For example, read buffers 621-632 are sized to accommodate a 96 element input vector, where each element is 1-byte, to a computational array. In various embodiments, read buffers 621-632 may be implemented as a single wide register, a single memory storage location, individual registers, or individual memory storage locations, among other implementations, as appropriate. In some embodiments, memory 601 and cache 603 are memory 502 and cache 503 of FIG. 5, respectively. In some embodiments, hardware data formatter 605 is data formatter 104 and/or weight formatter 106 of FIG. 1. In some embodiments, hardware data formatter 605 is data formatter 504 and/or weight formatter 506 of FIG. 5.

In various embodiments, a control unit (not shown) such as control unit 101 of FIG. 1 and a computational array (not shown) such as matrix processor 107 of FIG. 1 are components of the microprocessor system. For example, a control unit sends signals to synchronize the processing of computational operations and/or access to memory 601. In various embodiments, a computational array receives input vectors from one or more hardware data formatters as input operands. For example, a matrix processor may receive two vector inputs, one from a data formatter and one from a weight formatter, to perform matrix processing on. As another example, a matrix processor may receive two matrices, one from a data formatter and one from a weight formatter, to perform matrix processing on. In various embodiments, multiple clock cycles are needed to feed an entire matrix into a computational array. For example, in some embodiments, at most one row (and/or column) of a matrix is fed into a computational array each clock cycle.

In various embodiments, the output of hardware data formatter 605 is fed as input to a computational array such as matrix processor 107 of FIG. 1 and matrix processor 507 of FIG. 5. In various embodiments, each element of each read buffer of hardware data formatter 605 is fed into a computation unit of a computational array. For example, the first byte of read buffer 621 is fed into a first computation unit of a computational array, the second byte of read buffer 621 is fed into a second computation unit of a computational array, the third byte of read buffer 621 is fed into a third computation unit of a computational array, and so forth, with the last byte of read buffer 621 (i.e., the eighth byte) feeding into the eighth computation unit of a computational array. The next read buffer then feeds its elements into the next set of computation units. For example, the first byte of read buffer 622 is fed into a ninth computation unit of a computational array and the last byte of read buffer 632 is fed into a ninety-sixth computation unit of a computational array. In various embodiments, the size and number of the read buffers and the number of computation units may vary. As explained above, in the example shown, hardware data formatter 605 includes 12 read buffers 621-632 configured to each store eight consecutive bytes. Hardware data formatter 605 may be configured to feed into a computation unit that may receive at least one input vector of 96 1-byte elements.

In some embodiments, only a portion of the elements in read buffers 621-632 is utilized as input to a computational array. For example, a two-dimensional 80×80 matrix may only utilize read buffers 621-630 (corresponding to 80 bytes, numbered bytes 0-79) to feed an 80-element row into a matrix processor. In various embodiments, hardware data formatter 605 may perform additional processing on one or more elements of read buffers 621-632 to prepare the elements as input to a computational array. For example, a computational array may be configured to receive 48 16-bit elements instead of 96 8-bit elements and hardware data formatter 605 may be configured to combine pairs of 1-byte elements to form 16-bit elements to prepare a 48 16-bit input vector for the computational array.

In various embodiments, cache 603 is a memory cache of memory 601. In some embodiments, memory 601 is implemented using static random access memory (SRAM). In some embodiments, cache 603 is a 1 KB memory cache and each cache line 611, 613, 615, and 617 is 256 bytes. In various embodiments, reading data into cache 603 loads an entire cache line of data into one of cache lines 611, 613, 615, and 617. In various embodiments, cache 603 may be larger or small and have fewer or more cache lines. Moreover, in various embodiments, the cache lines may be a different size. The size and configuration of cache 603, cache lines 611, 613, 615, and 617, and memory 601 may be sized as appropriate for the particular workload of computational operations. For example, the size and number of image filters used for convolution may dictate a larger or smaller cache line and a larger or smaller cache.

In the example shown, the dotted-lined arrows originating from read buffers 621-632 indicate whether the data requested by hardware data formatter 605 exists as a valid entry in cache 603 and in particular which cache line holds the data. For example, read buffers 621, 622, and 623 request data that is found in cache line 611. Read buffers 626 and 627 request data that is found in cache line 613 and read buffers 630, 631, and 632 request data that is found in cache line 617. In various embodiments, each read buffer stores a subset of values located consecutively in the memory. The subsets of values stored at read buffers 621, 622, and 623 may not be located consecutively in memory with the subsets of values stored at read buffers 626 and 627 and also may not be located consecutively in memory with the subsets of values stored at read buffers 630, 631, and 632. In some scenarios, read buffers referencing the same cache line may store subsets of values that are not located consecutively in memory. For example, two read buffers may reference the same cache line of 256 bytes but different 8-byte subsets of consecutive values.

In the example shown, the data requested for read buffers 624, 625, 628, and 629 are not found in cache 603 and are cache misses. In the example shown, an "X" depicts a cache miss. In various embodiments, cache misses must be resolved by issuing a read for the corresponding subset of data from memory 601. In some embodiments, an entire cache line containing the requested subset of data is read from memory 601 and placed into a cache line of cache 603. Various techniques for cache replacement may be utilized as appropriate. Examples of cache replacement policies for determining the cache line to use include First In First Out, Least Recently Used, etc.

In some embodiments, each of read buffers 621-632 stores a subset of values located consecutively in memory. For example, in the example shown, read buffer 621 is 8-bytes in size and stores a subset of 8-bytes of values stored consecutively in memory. In various embodiments, the values are located consecutively in memory 601 and read as a continuous block of values into a cache line of cache 603. By implementing read buffers using the concept of a subset of values, where each of the values is located consecutively in memory, each read buffer is capable of loading multiple elements (e.g., up to eight elements for an 8-byte read buffer) together. In the example shown, a fewer number of reads are required than the number of elements to populate every read buffer with an element. For example, up to twelve reads are required to load 96-elements into the twelve read buffers 621-632. In many scenarios, even fewer reads are necessary in the event that a cache contains the requested subset of data. Similarly, in some scenarios, a single cache line is capable of storing the data requested for multiple read buffers.

In some embodiments, read buffers 621-632 are utilized by hardware data formatter 605 to prepare input operands such as an vector of inputs for a computational array, such as matrix processor 107 of FIG. 1. In some embodiments, the 96-bytes stored in read buffers 621-632 correspond to a 96-element input vector for a computational array. In some embodiments, hardware data formatter 605 selects elements from read buffers 621-632 to accommodate a particular stride when performing a computational operation such as convolution. In some embodiments, hardware data formatter 605 selectively filters out the elements from read buffers 621-632 that are not required for the computational operation. For example, hardware data formatter may only utilize a portion of the elements from each read buffer (e.g., every other byte of a read buffer) as the input vector elements for the computational array. In some embodiments, the filtering is performed using a multiplexer to selectively include elements from read buffers 621-632 when preparing an input vector for a computational operation. In various embodiments, the unused bytes of the read buffer may be discarded.

As an example, in a scenario with a stride parameter set to two, the initial input elements for a convolution operation are every other element of a row of an input matrix. Depending on the input matrix size, the elements include the 1st, 3rd, 5th, and 7th elements, etc., for the first group of input elements necessary for a convolution operation. Read buffer 621 is configured to read the first 8 elements (1 through 8), and thus elements 2, 4, 6, and 8 are not needed for a stride of two. As another example, using a stride of five, four elements are skipped when determining the start of the next neighboring region. Depending on the size of the input data, the 1st, 6th, 11th, 16th, and 21st elements, etc., are the first input elements necessary for a convolution operation. The elements 2-5 and 7-8 are loaded into a read buffer 621 but are not used for calculating the first dot-product component result corresponding to each region and may be filtered out.

In various embodiments, each read buffer loads eight consecutive elements and can satisfy two elements for a stride of five. For example, read buffer 621 initiates a read at element 1 and also reads in element 6, read buffer 621 initiates a read at element 11 and also reads in element 16, read buffer 622 initiates a read at element 21 and also reads in element 26, etc. In some embodiments, the reads are aligned to multiples of the read buffer size. In some embodiments, only the first read buffer is aligned to a multiple of the read buffer size. In various embodiments, only the start of each matrix row must be aligned to a multiple of the read buffer size. Depending on the stride and the size of the input matrix, in various embodiments, only a subset of the read buffers may be utilized. In various embodiments, the elements corresponding to least twelve regions, one element for each read buffer 621-632, are loaded and fed to a computational array in parallel. In various embodiments, the number of input elements provided in parallel to a computational array is at least the number of read buffers in the hardware data formatter.

In some embodiments, the elements not needed for the particular stride are filtered out and not passed to the computational array. In various embodiments, using, for example, a multiplexer, the input elements conforming to the stride are selected from the loaded read buffers and formatted into an input vector for a computational array. Once the input vector is formatted, hardware data formatter 605 feeds the input vector to the computational array. The unneeded elements may be discarded. In some embodiments, the unneeded elements may be utilized for the next dot-product component and a future clock cycle and are not discarded from read buffers 621-632. In various embodiments, the elements not needed for implementing a particular stride are fed as inputs to a computational array and the computational array and/or post-processing will filter the results to remove them. For example, the elements not needed may be provided as input to a computation array but the computation units corresponding to the unnecessary elements may be disabled.

In some embodiments, hardware data formatter 605 formats the input vector for a computational array to include padding. For example, hardware data formatter 605 may insert padding using read buffers 621-632. In various embodiments, one or more padding parameters may be described by a control unit using a control signal and/or instruction parameter.

In some embodiments, hardware data formatter 605 determines a set of addresses for preparing operands for a computational array. For example, hardware data formatter 605 calculates associated memory locations required to load a subset of values, determines whether the subset is cached, and potentially issues a read to memory for the subset in the event of a cache miss. In some scenarios, a pending read may satisfy a cache miss. In various embodiments, hardware data formatter 605 only processes the memory address associated with the start element and end element of each read buffer 621-632. In various embodiments, each read buffer 621-632 associates the validity of the cache entry for a subset of values with the memory addresses of the start and end values of the corresponding read buffer. In the example shown, read buffer 621 is configured to store 8-bytes corresponding to up to eight elements. In various embodiments, hardware data formatter 605 calculates the address of the first element and the address of the last element of read buffer 621. Hardware data formatter 605 performs a cache check on the first and last element addresses. In the event either of the addresses is a cache miss, hardware data formatter 605 issues a memory read for 8-bytes starting at the address of the first element. In the event that both addresses are a cache hit from the same cache line, hardware data formatter 605 considers every element in the subset to be a valid cache hit and loads the subset of values from the cache via the appropriate cache line. In this manner, an entire row of elements may be loaded by processing the addresses of at most the first and last addresses of each read buffer 621-632 (e.g., at most 24 addresses).

Figure 7:
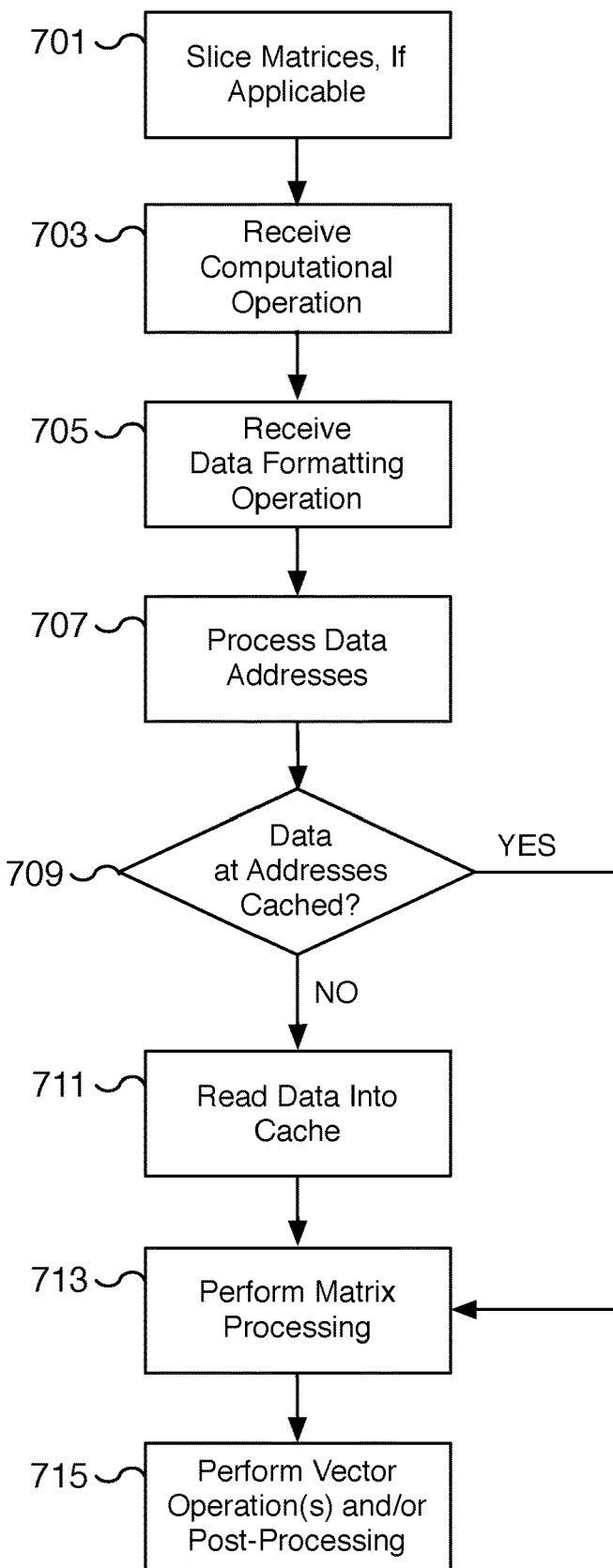
FIG. 7 is a flow diagram illustrating an embodiment of a process for performing machine learning processing.

FIG. 7 is a flow diagram illustrating an embodiment of a process for performing machine learning processing. The process of FIG. 7 describes a pipeline for slicing one or more matrices to fit a computational array, receiving a computational operation for the sliced matrix or matrices, preparing the data for performing the operation, and computing one or more results associated with the operation. Depending on the application, the process of FIG. 7 may be repeated on different slices of a matrix and the results combined. For example, a frame of image data larger than a computational array may be sliced into smaller matrices and computational operations performed on the sliced matrices. The results of multiple passes of FIG. 7 on different slices may be combined to generate the result of a computational operation on the entire frame. In various embodiments, the process of FIG. 7 is performed by a microprocessor system such as the microprocessor system of FIGS. 1 and 5. In various embodiments, the process of FIG. 7 is utilized to implement applications relying on computational operations such as convolution. For example, the process of FIG. 7 may be utilized to implement a machine learning application that performs inference using a machine learning model. In some embodiments, the process of FIG. 7 is utilized to implement the processes of FIGS. 2 and 3.

At 701, one or more matrices may be sliced. In some embodiments, the size of a matrix, for example, a matrix representing a frame of vision data, is larger than will fit in a computational array. In the event the matrix exceeds the size of the computational array, the matrix is sliced into a smaller two-dimensional matrix with a size limited to the appropriate dimensions of the computational array. In some embodiments, the sliced matrix is a smaller matrix with addresses to elements referencing the original matrix. In various embodiments, the sliced matrix is serialized into a vector for processing. In some embodiments, each pass of the process of FIG. 7 may slice a matrix into a different slice and slices may overlap with previous slices. In various embodiments, a data matrix and a weight matrix may both be sliced, although typically only a data matrix will require slicing. In various embodiments, matrices may be sliced only at boundaries corresponding to multiples of the read buffer size of a hardware data formatter. For example, in the event each read buffer is 8-bytes in size, each row of a sliced matrix must begin with an address having a multiple of eight. In the event a matrix fits within the computational array, no slicing is required (i.e., the matrix slice used for the remaining steps of FIG. 7 is simply the original matrix). In various embodiments, the matrix slice(s) are used as input matrices for the computational operation of 703.

At 703, a computational operation is received. For example, a matrix operation is received by the microprocessor system. As one example, a computational operation requesting a convolution of an image with a filter is received. In some embodiments, the operation may include the necessary parameters to perform the computational operation including the operations involved and the operands. For example, the operation may include the size of the input operands (e.g., the size of each input matrix), the start address of each input matrix, a stride parameter, a padding parameter, and/or matrix, vector, and/or post-processing commands. For example, a computational operation may describe an image data size (e.g., 96×96, 1920×1080, etc.) and bit depth (e.g., 8-bits, 16-bits, etc.) and a filter size and bit depth, etc. In some embodiments, the computational operation is received by a control unit such as control unit 101 of FIG. 1 and 501 of FIG. 5. In some embodiments, a control unit processes the computational operation and performs the necessary synchronization between components of the microprocessor system. In various embodiments, the computational operation is a hardware implementation using control signals. In some embodiments, the computational operation is implemented using one or more processor instructions.

At 705, each hardware data formatter receives a data formatting operation. In some embodiments, the data formatting operation is utilized to prepare input arguments for a computational array such as matrix processor 107 of FIG. 1 and 507 of FIG. 5. For example, each hardware data formatter receives a data formatting operation that includes information necessary to retrieve the data associated with a computational operation (e.g., a start address of a matrix, a matrix size parameter, a stride parameter, a padding parameter, etc.) and to prepare the data to be fed as input into the computational array. In some embodiments, the data formatting operation is implemented using control signals. In some embodiments, the data formatting operation is received by a hardware data formatter such as data formatter 104 and 504 of FIGS. 1 and 5, respectively, and weight formatter 106 and 506 of FIGS. 1 and 5, respectively. In some embodiments, hardware data formatter is hardware data formatter 605 of FIG. 6. In some embodiments, a control unit such as control unit 101 of FIG. 1 and 501 of FIG. 5 interfaces with a hardware data formatter to process data formatting operations.

At 707, data addresses are processed by one or more hardware data formatters. For example, addresses corresponding to elements of the computational operation are processed by one or more hardware data formatters based on the formatting operations received at 705. In some embodiments, the addresses are processed in order for the hardware data formatter to load the elements (from a cache or memory) and prepare an input vector for a computational array. In various embodiments, a hardware data formatter first calculates a pair of memory addresses for each subset of values to determine whether a subset of elements exists in a cache before issuing a request to memory in the event of a cache miss. In various embodiments, a read request to memory incurs a large latency that may be minimized by reading elements from a cache. In some scenarios, all elements are read from a cache and thus require any cache misses to first populate the cache by issuing a read to memory. To minimize the latency for each read, in various embodiments, the reads are performed on subsets of elements (or values). In some embodiments, memory may only have a limited number of read ports, for example, a single read port, and all reads are processed one at a time. For example, performing 96 independent reads incurs the latency of 96 independent reads for a memory with a single read port. To reduce read latency, subsets of values are read together from memory into corresponding read buffers of a hardware data formatter. For example, using subsets of eight values, at most 12 memory reads are required to read 96 values. In the event some of the subsets are in the cache from previous memory reads, even fewer memory reads are required.

In various embodiments, subsets of values are prepared by determining the memory addresses for the start value of each subset (where each value corresponds to an element) and the end value of each subset. For example, to prepare a subset of 8-values each of 1-byte, a cache check is performed using the calculated address of the start value and the calculated address of the end value of the subset. In the event either of the addresses are cache misses, a memory read is issued to read 8-bytes from memory beginning at the address of the start value. In some embodiments, in addition to reading the requested 8-bytes from memory, an entire cache line of data (corresponding to multiple subsets) is read from memory and stored in the cache. In various embodiments, in the event the start and end addresses of a subset are cached at the same cache line, the entire subset of values is considered cached and no cache check is needed for the remaining elements of the subset. The entire subset is considered cached in the event the start and end elements are cached in the same cache line. In various embodiments, the processing at 707 determines the addresses of the start value of the subset and the end value of the subset for each subset of values. In various embodiments, one read buffer exists for each subset of values. In various embodiments, read buffers of a hardware data formatter are read buffers 621-632 of hardware data formatter 605 of FIG. 6.

In some embodiments, a stride parameter is implemented and non-consecutive subsets of values are loaded into each read buffer. In various embodiments, each subset of continuous values includes one or more elements needed to implement a particular stride parameter. For example, for a stride of one, every value in a subset of values located consecutively in memory is a utilized element. As another example, for a stride of two, every other value located consecutively in memory is utilized and a subset of eight consecutive values includes four utilized elements and four that are not utilized. As another example, for a stride of five, a subset of eight values located consecutively in memory may include two utilized elements and six unused elements. For each subset of elements located consecutively in memory, the memory addresses for the start and end elements of the subset are determined and utilized to perform a cache check at 709. In various embodiments, the start element of the subset is the first element of the subset. In some embodiments, the end element of the subset is the last element of the subset, regardless of whether the element is utilized to implement the stride parameter. In some embodiments, the end element of the subset is the last utilized element and not the last element of the subset.

In various embodiments, once the number of utilized elements that are included in a subset of consecutive elements is determined, the next subset of elements begins with the next element needed to satisfy the stride parameter. The next element may result in a memory location that is located at an address non-consecutive with the address of the last element of the previous subset. As an example, using a stride of five, four elements are skipped when determining the start of the next subset of values. Depending on the size of the input data, the 1st and 6th elements are stored in the first subset of values, 11th and 16th elements in the second subset of values, and 21st and 26th elements in the third subset of values, etc. In various embodiments, the second subset of values starts with the 11th element and the third subset of values starts with the 21st element. Each subset is located in memory at locations non-consecutive with the other subsets. Examples of unused elements in the first subset of values include the elements 2-5 and 7-8. In some embodiments, the first row of each matrix is aligned to a multiple of the subset size. In some embodiments, this alignment restriction is required to prevent gaps of invalid values between rows when a matrix is serialized. In some embodiments, all subsets are aligned to the multiple of the subset size.

In various embodiments, each subset of values is loaded in a read buffer such as read buffers 621-632 of FIG. 6. Depending on the particular application (e.g., the stride, the size of the input matrix, the size of the read buffer, the number of read buffers, etc.), some of the read buffers of a hardware data formatter may not be utilized. In some scenarios, the number of input elements provided in parallel to a computational array is at least the number of subsets. For example, a hardware data formatter supporting twelve subsets of values can provide at least twelve elements in parallel to a computational array.

In some embodiments, the formatting performed by a hardware data formatter includes converting a matrix into a vector with elements of the vector fed to a computational array over multiple clock cycles. For example, in some embodiments, a matrix corresponding to data (e.g., image data) is formatted to prepare vectors corresponding to sub-regions of the data. In some embodiments, each element fed to a computational array for a particular clock cycle corresponds to the n-th element of a vector associated with a sub-region of the data. As an example, a 3×3 matrix may be formatted into a one-dimensional vector of nine elements. Each of the nine elements may be fed into the same computation unit of a computational array. In various embodiments, feeding the 9 elements requires are least 9 clock cycles.

At 709, a determination is made whether the data corresponding to the addresses determined for each subset at 707 are cached. For example, a cache check is performed on each subset by determining whether the data associated with the address of the start value of the subset and the address of the end value of the subset is in the same cache line. In various embodiments, a cache check is performed for each read buffer, such as read buffers 621-632 of FIG. 6, of a hardware data formatter. In the event the data is cached, the processing continues to 713. In various embodiments, the cache utilized is cache 503 of FIG. 5 and/or 603 of FIG. 6. In the event the data is not cached, processing continues to 711.

At 711, each requested subset of data is read into the cache as an entire subset of values. In various embodiments, each subset data is read into the cache from memory. In some embodiments, the memory is memory 102 of FIG. 1, 502 of FIG. 5, and/or 601 of FIG. 6. In some embodiments, an entire cache line is read into the cache. For example, a cache miss for a subset of values results in loading the subset of values into a cache line along with the other data located consecutively with the subset of values in memory. In some scenarios, a single cache line is sufficient to cache multiple subsets.

At 713, matrix processing is performed. For example, a matrix processor performs a matrix operation using the data cached and received by a hardware data formatter. In various embodiments, the cached data is received by the hardware data formatter and processed according to a formatting operation by a hardware data formatter into input values for matrix processing. In some embodiments, the processing by the hardware data formatter includes filtering out a portion of the received cached data. For example, in some embodiments, subsets of values located consecutively in memory are read into the cache and received by the hardware data formatter. In various embodiments, a computational operation may specify a stride and/or padding parameters. For example, to implement a specified stride for convolution, one or more data elements may be filtered from each subset of values. In some embodiments, only a subset of the elements from each of the subsets of values is selected to create an input vector for matrix processing.

In various embodiments, the matrix processor performs the computational operation specified at 703. For example, a matrix processor such as matrix processor 107 of FIG. 1 and 507 of FIG. 5 performs a matrix operation on input vectors received by hardware data formatters. In various embodiments, the matrix processor commences processing once all the input operands are made available. The output of matrix processing is fed to 715 for optional additional processing. In various embodiments, the result of matrix processing is shifted out of a computational array one vector at a time.

At 715, vector and/or post-processing operations are performed. For example, vector processing may include the application of an activation function such as a rectified linear unit (ReLU) function. In some embodiments, vector processing includes scaling and/or normalization. In various embodiments, vector processing is performed on one vector of the output of a computational array at a time. In some embodiments, vector processing is performed by a vector processor such as vector engine 111 of FIG. 1. In various embodiments, post-processing operations may be performed at 715. For example, post-processing operations such as pooling may be performed using a post-processor unit. In some embodiments, post-processing is performed by a post-processing processor such as post-processing unit 115 of FIG. 1. In some embodiments, vector and/or post-processing operations are optional operations.

Figure 8:
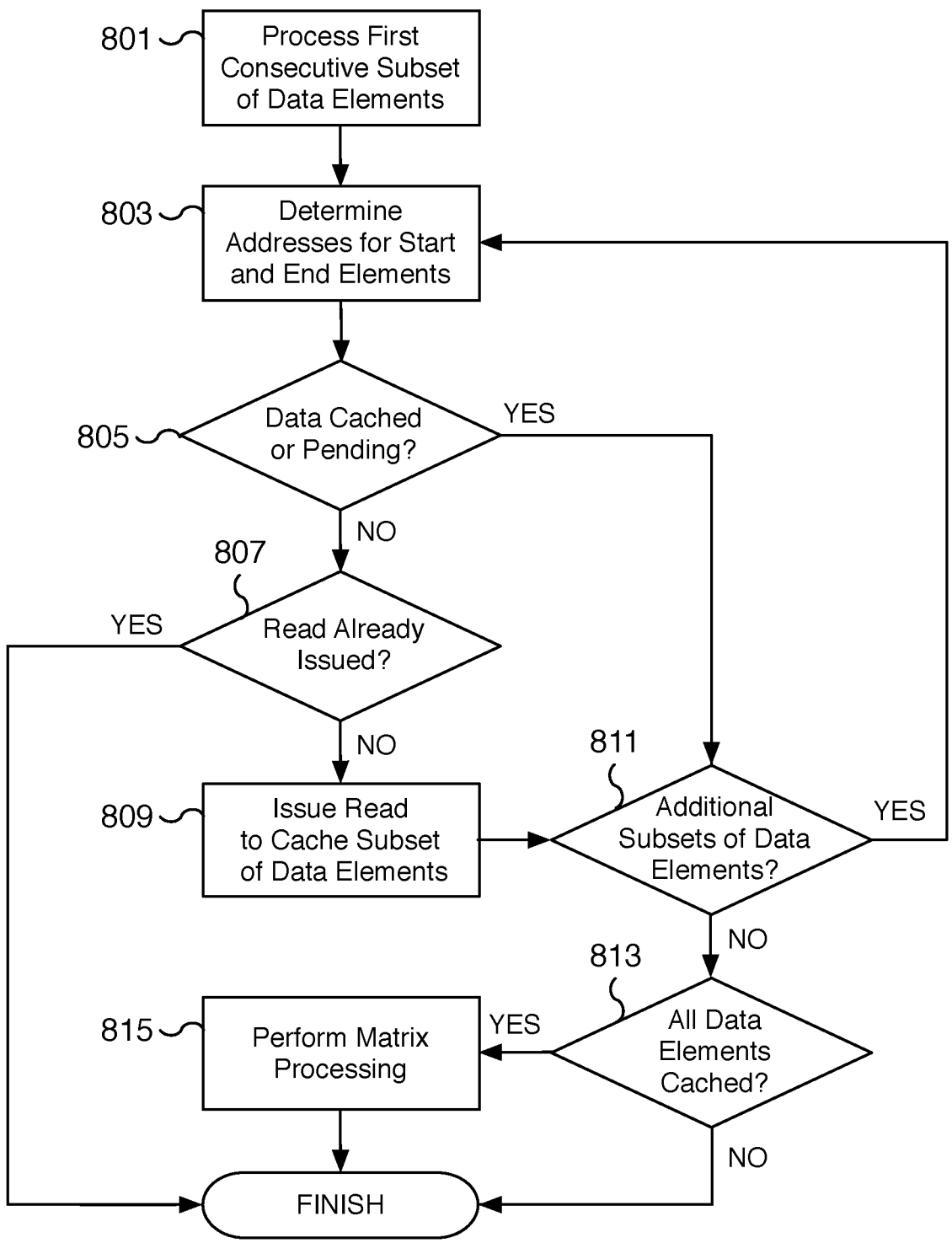
FIG. 8 is a flow diagram illustrating an embodiment of a process for retrieving input operands for a computational array.

FIG. 8 is a flow diagram illustrating an embodiment of a process for retrieving input operands for a computational array. The process of FIG. 8 describes a process for preparing data elements by a hardware data formatter for a computational array. For example, the input data is partitioned into subsets based on the number of read buffers of a hardware data formatter. The process of FIG. 8 is utilized to load the corresponding read buffers with data corresponding to subsets of values located consecutively in memory. By partitioning values into subsets based on memory location and performing a single read on the entire subset instead of an individual read for each element, the latency incurred from accessing memory is reduced. In various embodiments, the process of FIG. 8 is performed by a microprocessor system such as the microprocessor system of FIGS. 1 and 5. In various embodiments, the process of FIG. 8 is implemented at 707, 709, 711, and 713 of FIG. 7. In various embodiments, the memory utilized by the process of FIG. 8 is memory 102 of FIG. 1, memory 502 of FIG. 5, and/or 601 of FIG. 6. In various embodiments, the cache utilized by the process of FIG. 8 is cache 103 of FIG. 3, cache 503 of FIG. 5, and/or 603 of FIG. 6. In various embodiments, the process of FIG. 8 is performed at least in part by a hardware data formatter such as the hardware data formatters of FIGS. 1, 5, and 6. For example, a hardware data formatter may be utilized to perform the steps of 801, 803, 805, 807, 809, 811, 813, and portions of 815. In some embodiments, the process of FIG. 8 is utilized to implement the processes of FIGS. 2 and 3.

In some embodiments, the process of FIG. 8 is performed in parallel on different read buffers and/or subset of values. For example, in a scenario with eight read buffers, the data to be loaded into the read buffers may be partitioned into at most eight subsets and the process of FIG. 8 is performed on each subset in parallel. In some embodiments, the number of subsets is based on capabilities of the cache and/or the memory. For example, the number of subsets may be based on how many simultaneous cache checks may be performed on the cache and/or the number of simultaneous reads to memory that may be issued.

At 801, the first subset of data elements located consecutively in memory is processed. In various embodiments, the first consecutive subset of data corresponds to the data element designated for the first read buffer of a hardware data formatter. In some embodiments, the address of the first element must be a multiple of the number of elements in each subset. For example, using an 8-byte read buffer, the address of the first element must be a multiple of eight.

At 803, start and end memory addresses are determined for the current subset. For example, the memory address of the start element of a subset and the memory address of the end element of a subset are determined. In various embodiments, the start and end addresses are determined by a hardware data formatter, such as the hardware data formatters of FIGS. 1, 5, and 6.

At 805, a determination is made on whether the subset of data is cached or pending a read. For example, a determination is made whether the data corresponding to the start and end addresses determined at 803 are cached at the same cache line or will be cached as a result of an already issued memory read. In some embodiments, a pending read for a different subset brings an entire cache line of data into memory and will result in caching the current subset. In the event the data is not cached or will not be cached as a result of a pending memory read, processing continues to 807. In the event the data is cached or will be cached by a pending memory read, processing continues to 811.

At 807, a determination is made on whether a memory read is already issued. In the event a memory read is already issued, processing completes for the current clock cycle. In the event a memory read has not been issued, processing continues to 809. In some embodiments, the memory is configured with a single read port (e.g., to increase density) and the memory can only process one read at a time. In various embodiments, the determination of whether a memory read has been issued is based on the capability of the memory configuration and/or the availability of memory read ports. Not shown in FIG. 8, in some embodiments, in the event an additional memory read is supported for the current clock cycle (despite a pending read), processing continues to 809; otherwise processing completes for the current clock cycle.

At 809, a read is issued to cache a subset of data elements. For example, a block of memory beginning at the start address determined at 803 and extending for the length based on the size of a read buffer is read from memory into the memory cache. In various embodiments, an entire cache line of memory is read into the memory cache. For example, in a scenario with a cache line of 256 bytes and read buffers each capable of storing 8-bytes, a memory read will read 256 bytes of continuous data into a cache line, which corresponds to 32 subsets of non-overlapping 8-byte values. In various embodiments, reading a subset of values as a single memory read request reduces the latency associated with loading each element. Moreover, reading multiple subsets of values together may further reduce the latency by caching other subsets of values that may be associated with other read buffers. In some embodiments, loading multiple subsets of values takes advantage of potential locality between the subsets resulting in lower latency. In some embodiments, the read issued is arbitrated by a hardware arbiter such as arbiter 123 of FIG. 1 and arbiter 905 of FIG. 9 using the processes described herein, especially with respect to FIGS. 10-12.

At 811, a determination is made on whether there are additional subsets of data elements. In the event that every subset has been processed, processing continues to 813. In the event that there are additional subsets to be processed, processing loops back to 803. In some embodiments, depending on the input size, one or more read buffers of a hardware data formatter may not be utilized.

At 813, a determination is made on whether all the data elements are cached. In the event some elements are not cached, processing completes for the current clock cycle to allow the non-cached data elements to be loaded from memory into the cache. In the event all the data elements are cached, the data elements are all available for processing and processing proceeds to 815.

At 815, matrix processing is performed. For example, the cached data elements are received at one or more hardware data formatters, formatted, and fed as input vector(s) to a computational array for processing. A computational array, such as matrix processor 107 of FIG. 1 and 507 of FIG. 5, performs matrix processing on the input vectors.

Figure 9:
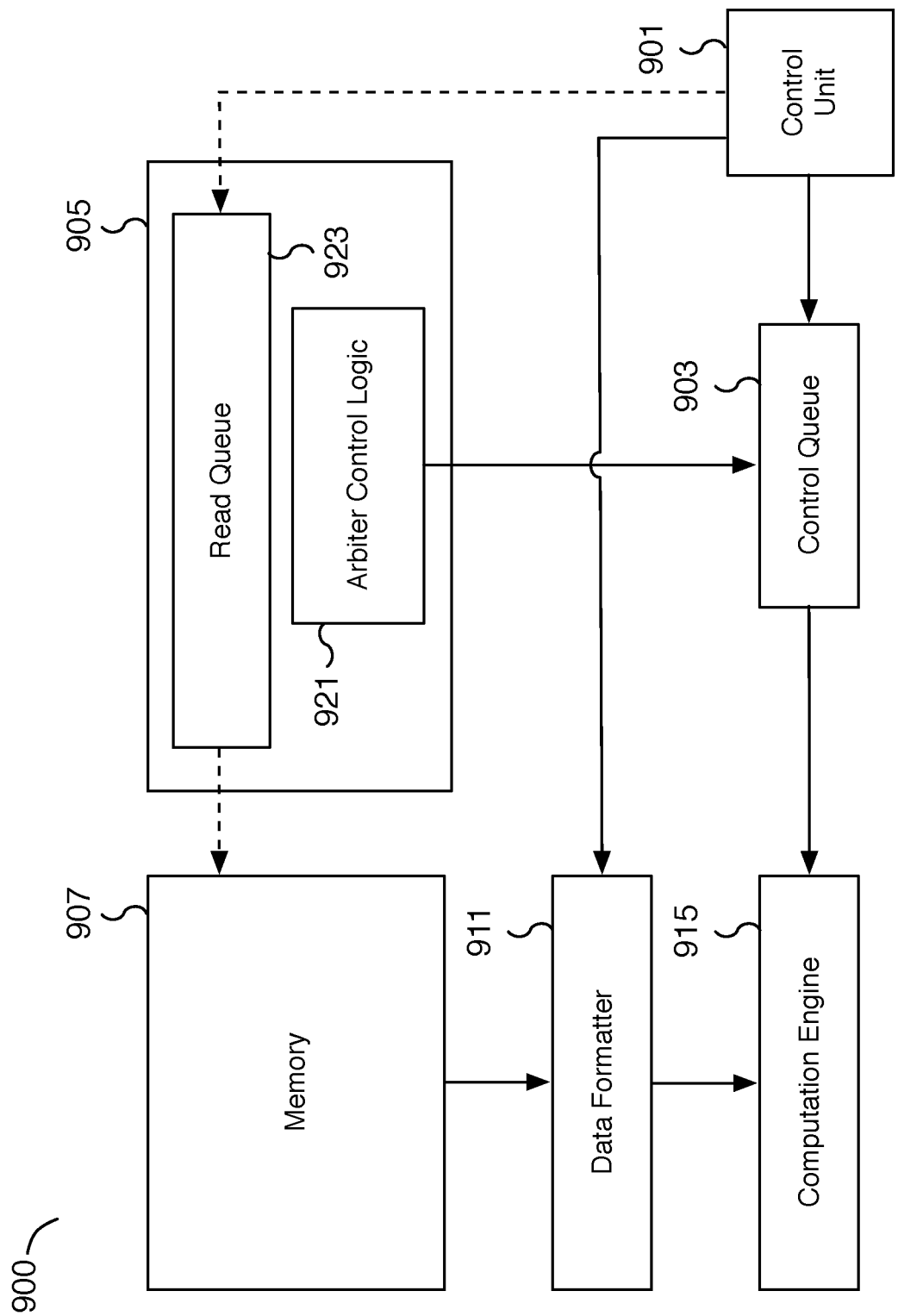
FIG. 9 is a block diagram illustrating an embodiment of a microprocessor system for synchronizing variable latency memory access.

FIG. 9 is a block diagram illustrating an embodiment of a microprocessor system for synchronizing variable latency memory access. For example, the microprocessor system of FIG. 9 includes a hardware arbiter for synchronizing, in hardware, control operations and input operands retrieved from memory. The microprocessor system 900 includes control unit 901, control queue 903, arbiter 905, memory 907, data formatter 911, and computation engine 915. Arbiter 905 includes arbiter control logic 921 and read queue 923. In various embodiments, the microprocessor system of FIG. 9 is a hardware only implementation for synchronizing variable latency memory access. In various embodiments, microprocessor system of FIG. 9 is part of the microprocessor system of FIGS. 1 and 5. In some embodiments, data formatter 911 is data formatter 605 of FIG. 6.

In various embodiments, the arrows of FIG. 9 depict the general and/or primary direction control signals, operations, and/or data flow between the various components when performing a machine learning processing. In some embodiments, communication may be bi-directional (not-shown) where applicable. For example, data may be received by data formatter 911 from memory in response to an issued memory read request (not shown in FIG. 9) from data formatter 911. In some embodiments, the issued memory read request is requested by data formatter 911 via arbiter 905.

In various embodiments, control unit 901 is communicatively connected to data formatter 911 and control queue 903. In some embodiments, control unit 901 is communicatively connected to arbiter 905, depicted as a dotted line. In various embodiments, control unit 901 sends a control operation corresponding to a computational array operation to be queued in control queue 903. In various embodiments, control unit 901 sends a control signal to data formatter 911. For example, control unit 901 may send a control signal to data formatter 911 describing arguments for formatting corresponding to the computational operation queued at control queue 903. In some embodiments, control unit 901 sends a control signal to arbiter 905 that describes memory access operations corresponding to the queued computational operation. In other embodiments, data formatter 911 sends a control signal to arbiter 905 that describes memory access operations corresponding to the queued computational operation and the data to be formatted, for example, in response to a control signal received by control unit 901.

In various embodiments, control queue 903 is a queue for storing computational array operations. In various embodiments, control queue 903 is a first-in-first-out queue that receives computational array operations from control unit 901 and de-queues computational array operations to computation engine 915. In various embodiments, the de-queue operation is performed in response to a control signal, such as a ready signal, from arbiter 905. For example, once an arbiter grants memory access to a data operand corresponding to the computational array operation queued at control queue 903, control queue 903 de-queues the computational array operation. In various embodiments, the dequeue action is timed so that the data operand retrieved from memory via arbiter 905 is synchronized to arrive at computation engine 915 with the computational array operation. In some embodiments, the ready signal from arbiter 905 is based on a completed read corresponding to a read request. In some embodiments, a computational array operation queued at control queue 903 relies on more than one data operand. For example, a matrix multiplication may require more than one memory access operations. In some embodiments, in the event the computational array operation queued at control queue 903 relies on more than one data operand, the computational array operation is de-queued so that all the data operands are synchronized to arrive at computation engine 915 with the computational array operation. For example, in the event two memory access operations are required and arbiter 905 generates one control signal for each memory access, control queue 903 will only release the computational array operation once the second control signal is received.

In some embodiments, control queue 903 includes additional stages to adjust for the latency required for data operands to be retrieved from memory 907 and formatted by data formatter 911. For example, control queue 903 may include one or more flip-flops to propagate a computational array operation from control queue 903 to computation engine 915. In some embodiments, alternative techniques are utilized to introduce a fixed latency from control queue 903 to computation engine 915 that corresponds to the latency to load data operand by data formatter 911. In various embodiments, the latency is a fixed number of clock cycles based on the amount of time required to perform a memory read and to format the retrieved data into operands for computation engine 915. Although not depicted in FIG. 9, as an alternative, in some embodiments, control queue 903 is included as part of control unit 901.

In various embodiments, the control signal received at control queue 903 initiate the release of a queued computational array operation may be received (not shown) from one or more data formatters, such as data formatter 911, in response to a control signal received at the data formatter from arbiter 905. For example, instead of arbiter 905 directly sending a ready control signal to control queue 903, the control signal is sent to data formatter 911. In various embodiments, the control signal received at control queue 903 is received indirectly from arbiter 905.

In some embodiments, arbiter 905 is utilized to control access to memory 907. In various embodiments, memory 907 has a limited number of read ports, for example, a single read port capable of only performing a single read at a time. As a result of a limited number of read ports, access to memory 907 must be limited. In various embodiments, arbiter 905 grants read access to read ports (not shown) of memory 907. In the example shown, arbiter 905 includes arbiter control logic 921 for processing memory access request, such as receiving and queuing read requests, granting memory access to queued read requests, and coordinating memory access with computational array operations. In various embodiments, arbiter 905 is a hardware arbiter. For example, arbiter 905 does not rely on software implementations to synchronize memory access with computational array operations.

In the example shown, arbiter 905 includes read queue 923 for queuing memory read access requests. In various embodiments, memory access requests are read requests to memory, such as memory 907. For example, a request to load data associated with a memory address of a matrix operand is a memory access request. In various embodiments, memory read requests are initiated by a data formatter such as data formatter 911. In various embodiments, one or more data formatters initiate memory access requests. For example, a hardware data formatter corresponding to data, such as sensor data, and a separate hardware data formatter corresponding to weights, such as weights representing a machine learning model, initiate read access requests for memory. The various read requests are queued in read queue 923 and may originate from different components of microprocessor system 900. In some embodiments, additional read queues may exist (not shown), for example, corresponding to different requesters, different memory modules, different read ports, etc. In various embodiments, the memory read requests correspond to the issued memory reads performed at 711 of FIG. 7 and/or 809 of FIG. 8.

In some embodiments, memory 907 is memory used for storing data operands for computation engine 915. For example, memory 907 may be static random access memory (SRAM). In various embodiments, memory 907 is high-density memory with limited read ports. For example, in order to increase the density of memory 907, the number of read ports are limited. In some embodiments, memory 907 includes a cache (not shown). In various embodiments, memory 907 may be dynamically partitioned to allocate portions of memory between data and weights. In various embodiments, memory 907 may be dynamically partitioned to allocate portions of memory for different purposes. In some embodiments, memory 907 is memory 102 of FIG. 1 and/or 601 of FIG. 6. In some embodiments, memory 907 includes a cache (not shown) to reduce latency.

In some embodiments, data formatter 911 is a hardware data formatter for preparing operands for a computational engine, such as computation engine 915. For example, data formatter 911 may initiate the loading of data operands from memory (and/or cache) and prepare the loaded operands as a group of values for input to a computation engine. In various embodiments, the length of time to load and format a data operand by data formatter 911 is a variable amount of time since the amount of time needed to read data from memory is variable. In some embodiments, the data formatter will issue a read request for data from memory and will stall a variable amount of time as the read request is pending access to memory. In various embodiments, the amount of time to format and send an input operand to computation engine 915 is a fixed amount and only the amount of time required to read an operand from memory is variable.

In various embodiments, one or more data formatters prepare operands for a computation engine. For example, a hardware data formatter 911 may align the data retrieved from memory 907 into a format compatible with computation engine 915. In some embodiments, hardware data formatter 911 inserts padding and/or applies a particular stride parameter to the retrieved data from memory 907. In various embodiments, additional data formatters (not shown) may exist and may be utilized to format additional operands for a computational array operation. For example, a hardware data formatter may exist for formatting data input and a separate hardware data formatter may exist for formatting weight input. In various embodiments, two or more separate hardware data formatter pipelines may exist in a microprocessor system (not shown) and arbiter 905 arbitrates the memory requests issued by each hardware data formatter and synchronizes the granted memory read requests with control operations from control unit 901.

In some embodiments, computation engine 915 is a computational array for preforming computational array operations. For example, computation engine 915 receives input operands from one or more data formatters and performs a matrix operation on the formatter operands. In various embodiments, computation engine 915 receives a computational operation from control queue 903. For example, computation engine 915 may receive an operation corresponding to a convolution operation from control queue 903. In some embodiments, the computation operation and the data operands must be synchronized and arrive at computation engine 915 for processing at the same clock cycle. In various embodiments, the output of computation engine 915 is fed into a vector processor (not shown) and/or post-processing processor (not shown). In various embodiments, computation engine 915 is matrix processor 107 of FIG. 1.

Figure 10:
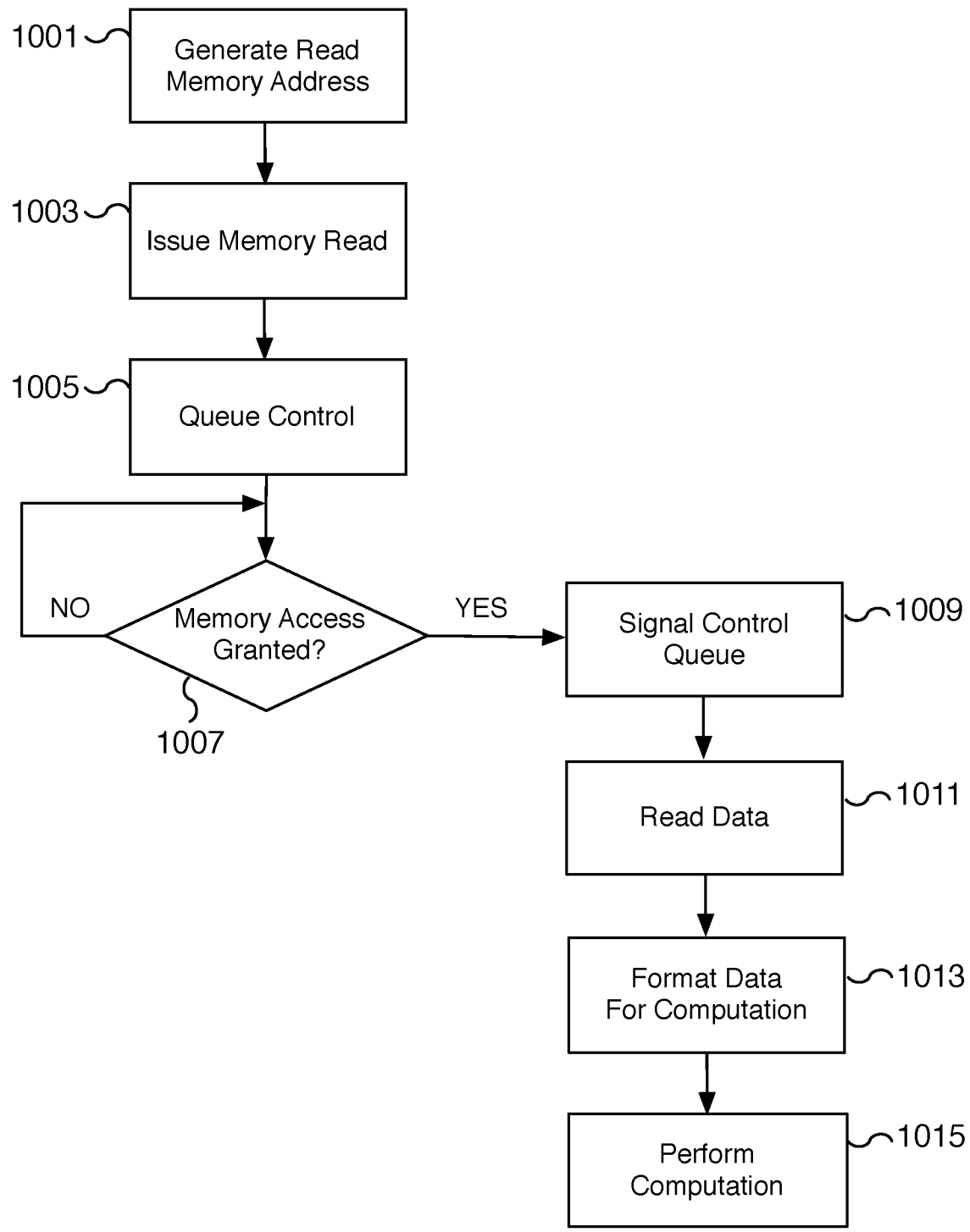
FIG. 10 is a flow diagram illustrating an embodiment of a process for performing machine learning processing.

FIG. 10 is a flow diagram illustrating an embodiment of a process for performing machine learning processing. The process of FIG. 10 may be used to prepare computational array operands and perform a computational array operation on the formatted operands. By queuing control operations and synchronizing the release of the queued control operation with the formatted data operands, the throughput of a microprocessor system is increased and the amount of time spent stalled waiting for a variable access latency memory read to complete is reduced. In various embodiments, the process of FIG. 10 is performed by the microprocessor system of FIGS. 1, 5, 6, and 9 to increase throughput and/or reduce power consumption when performing computational operations.

At 1001, a read memory address is generated. In some embodiments, the memory address is generated by a data formatter. In various embodiments, the address is generated by a hardware data formatter such as data formatter 104 or weight formatter 106 of FIG. 1. As another example, the address is generated by a hardware data formatter such as data formatter 605 or 911 of FIGS. 6 and 9, respectively. For example, a hardware data formatter generates an address corresponding to a matrix operand such as a two-dimensional region of an image for convolution. As explained in further detail above, in some embodiments, the step of 1001 is performed at 707 of FIG. 7 to generate a memory address corresponding to subset of values located consecutively in memory.

At 1003, a memory read is issued. For example, a memory read is issued for the data corresponding to the data address generated at 1001. In various embodiments, the memory read request may be a read for a block of elements starting at an address corresponding to a first element of a subset of elements located consecutively in memory.

At 1005, a control operation is queued. For example, a control operation is queued in a control queue such as control queue 103 and 903 of FIGS. 1 and 9, respectively. In various embodiments, the control operation corresponds to one or more operands of the memory address generated at 1001 and the control operation is queued so that it may be scheduled to arrive at a computational array in time with the operands. In various embodiments, a control operation corresponds to a computational array operation issued by a control unit of the microprocessor system such as control unit 101 and 901 of FIGS. 1 and 9, respectively.

At 1007, a determination is made whether memory access is granted. For example, for each memory read request issued, access to memory must be first granted before a memory read can be performed. In some embodiments, the memory has a limited number of read ports and thus a limited number of reads may be performed simultaneously. In some embodiments, the memory has a single read port and only one read can be performed at a time. In various embodiments, reads are queued up and issued by an arbiter, such as arbiter 123 and 905 of FIGS. 1 and 9, respectively. Once a particular read is granted memory access, that read can retrieve the requested data from memory. In the event memory access is granted, processing continues to 1009. In the event memory access is not granted, processing loops back to 1007. In various embodiments, a read issued at 1003 waits at 1007 until the read is granted access to memory and the memory read can be performed. By using an arbiter to grant memory access, the system is able to maintain synchronization between the control operations and data for operands.

At 1009, the control queue is signaled. In some embodiments, the signal is sent based on a determination that memory access is granted at 1007. In various embodiments, the signal is a ready signal corresponding to a memory access request. Once access to memory is granted, the latency to perform a memory read and/or to format the retrieved data can be determined. In various embodiments, the latency is a fixed amount of time. For example, in some embodiments, the latency to retrieve data from memory once memory access is granted and to format the received data as an operand is a fixed number of clock cycles. By determining, in advance the fixed number of clock cycles required to read and format a data operand, a computation operation queued in a control queue can be released and be configured to arrive at a computational array in sync with formatted data operands.

At 1011, data is read from memory. In some embodiments, a block of data corresponding to a subset of elements located consecutively in memory is read. In various embodiments, the read is the read issued at 1003.

In an alternative embodiment (not shown), the control queue signaled at 1009 is signaled after the data is read from memory, effectively swapping the steps 1009 and 1011. For example, the data is read from memory and once the data is received at a hardware data formatter, the hardware data formatter signals a control queue. In some embodiments, the ready signal received at control queue is based on a completed memory read instead of a memory access grant (as shown).

At 1013, data is formatted for computation. For example, data is retrieved from memory at 1011 and arrives at a hardware data formatter such as data formatter 104 or weight formatter 106 of FIG. 1. As another example, hardware data formatter may be data formatter 605 or 911 of FIGS. 6 and 9, respectively. In various embodiments, a hardware data formatter formats the operands to arrive at a computational array as a group of values. In some embodiments, the values are formatted as described above, for example, with respect to FIGS. 3 and 6, among others. In various embodiments, formatting includes aligning the data and/or formatting the data based on a stride and/or padding parameter.

At 1015, a computational array operation is performed. For example, a matrix operation is performed by a computational array. As another example, a convolution operation is performed using a matrix processor. In some embodiments, vector processing and/or post-processing may be performed as well. In various embodiments, a group of values is made available from one or more hardware data formatters along with a computational array operation during the same clock cycle. For example, a group of values is formatted by a hardware data formatter at 1013 and arrives at a computational array in sync with a computational operation via a control queue. The computation array performs a computational operation as described by the computational operation with the provided data operands.

Figure 11:
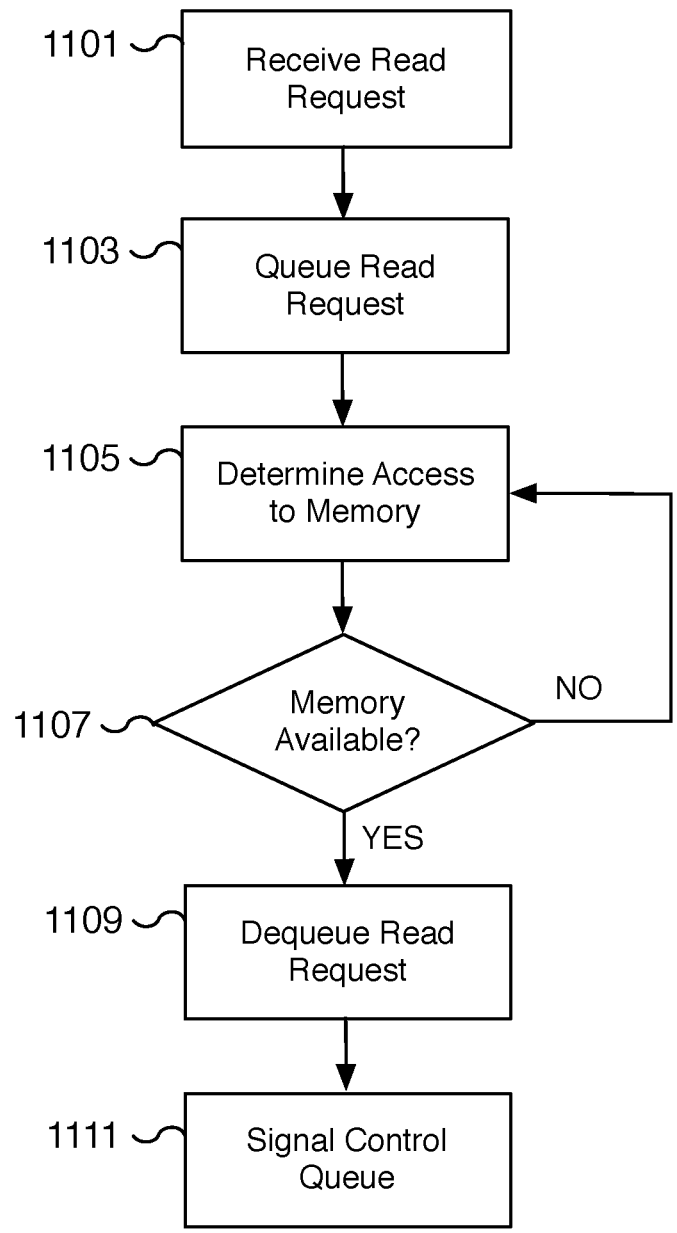
FIG. 11 is a flow diagram illustrating an embodiment of a process for synchronizing memory access with a control operation.

FIG. 11 is a flow diagram illustrating an embodiment of a process for synchronizing memory access with a control operation. For example, the process of FIG. 11 may be performed by a memory access arbiter to synchronize the availability of data operands with a computational operation for a computational array when accessing variable latency memory. In some embodiments, the process of FIG. 11 may be used as part of the process for performing a computational array operation on the formatted operands. In various embodiments, the process of FIG. 11 is performed by the microprocessor system of FIGS. 1, 5, 6, and 9. In some embodiments, the process of FIG. 11 is performed by an arbiter such as arbiter 105 and 905 of FIGS. 1 and 9, respectively. In various embodiments, the arbiter is a hardware arbiter that synchronizes the arrival of operand data and a computational operation. For example, a hardware arbiter is synchronized based on clock cycles. Unlike a software implementation, the arbiter is configured in hardware to signal a control queue to release a computational operation corresponding to data associated with a granted memory access. By implementing the arbiter using signaling hardware, the throughput of computational operations is increased and the power consumption is reduced. In various embodiments, the corresponding microprocessor system can operate at a higher clock speed.

At 1101, a read request is received by a hardware arbiter. In various embodiments, the read request is a memory read request. For example, a read request may be a memory read request corresponding to one or more elements in memory. As another example, the read request corresponds to a subset of elements located consecutively in memory. In various embodiments, a read request may arrive from one or more different hardware data formatters. For example, a read request may arrive from either a data or a weight data formatter to read data corresponding to data or weights. In some embodiments, a read request is issued by data formatter 104 and/or weight formatter 106 of FIG. 1. In some embodiments, the read request is issued by data formatter 911 of FIG. 9.

At 1103, the read request received at 1101 is queued. In various embodiments, read requests issued from different sources are queued in a single queue. For example, a request from a data hardware data formatter and a weight hardware data formatter are queued in the same queue and arranged based on arrival time. In some embodiments, one or more queues exist. For example, in some embodiments, more than one queue exists and queues exist corresponding to the hardware data formatter requesting the memory read. For example, a separate queue exists for data requests and for weight requests. In various embodiments, having separate queues allows the arbiter to prioritize requests from one queue over another queue, direct requests to different memory read ports, direct requests to different memory regions, etc. In some embodiments, a single queue is used to implement similar functionality by storing metadata associated with the source of the read request.

At 1105, a determination is made on whether memory access is granted. For example, the pending element of a read queue is examined and determined whether to grant memory access to perform the memory read corresponding to the elements. In some embodiments, a determination is made whether an existing memory read is being performed and/or whether an existing memory read has completed. In various embodiments, at step 1105, a determination is made whether memory may be accessed based on the availability of read ports of the memory.

At 1107, in the event the memory is available to service a memory read, processing proceeds to 1109. In the event the memory is not available to service a memory, processing loops back to 1105 to determine the appropriate time to grant access to read memory for a particular read request.

At 1109, a read request is dequeued from the read queue. In various embodiments, the read request corresponds to a read request queued at 1103. For example, one or more read requests are queued in a read queue at 1103 and the first arrived request is dequeued at 1109. The first arrived request corresponds to the request that arrived the earliest. In some embodiments, the request with the highest priority is dequeued and may not correspond to the request that arrived the earliest. In some embodiments, the request is a memory request for a subset of elements located consecutively in memory. In various embodiments, once a read request is dequeued, the read corresponding to the request is performed to retrieve the data requested from memory.

At 1111, a ready signal is sent to a control queue corresponding to the read request dequeued at 1109. In some embodiments, the ready signal is sent once the read has completed. In some embodiments, the ready signal is sent when the read request is dequeued. In various embodiments, the latency used to synchronize a control operation with one or more data reads is based on the amount of time (e.g., clock cycles) it takes for the data to be formatted and provided to the computational array. For example, the read request dequeued at 1109 corresponds to a computational operation queued at a control queue. At 1111, the control queue receives a signal from the arbiter that informs the control queue that memory access has been granted for the data associated with a queued computational operation. In various embodiments, once memory access is granted, the data is available in a fixed number of clock cycles. In various embodiments, the signal sent from the arbiter to the control queue informs the control queue to make the corresponding computational operation available after the determined fixed number of clock cycles. As described above and with respect to FIG. 12, in some embodiments, the control queue is triggered to dequeue a control operation based on one or more memory reads. For example, some computational operations require performing more than one memory read and the computational operation is dequeued based on memory access being granted for the final memory read.

Figure 12:
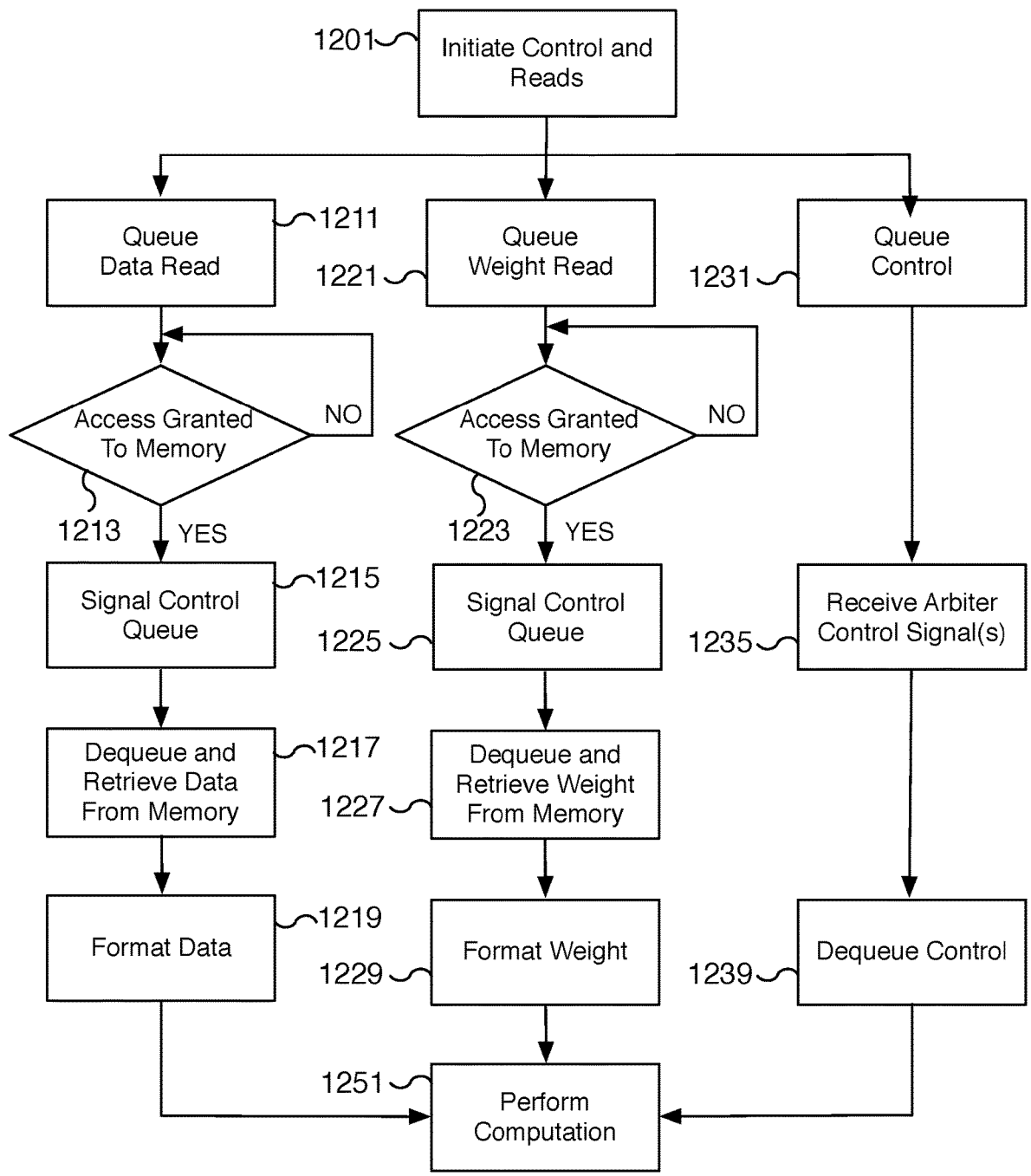
FIG. 12 is a flow diagram illustrating an embodiment of a process for synchronizing memory access with a control operation.

FIG. 12 is a flow diagram illustrating an embodiment of a process for synchronizing memory access with a control operation. For example, the process of FIG. 12 may be used to perform matrix operations on data, such as sensor data, using weights, such as weights trained based on a machine learning model, where the data and/or weights are retrieved from memory with variable access times. In some embodiments, the process of FIG. 12 is utilized by a microprocessor system such as the microprocessor system of FIG. 1 with different pipelines for retrieving weights and data. The process of FIG. 12 may be used to synchronize the arrival of a control operation, input data, and input weights at a computational array when accessing variable latency memory using a hardware arbiter. In some embodiments, the process of FIG. 12 may be used as part of the process for performing a computational array operation on the formatted operands retrieved from memory. In various embodiments, the process of FIG. 12 is performed by the microprocessor system of FIGS. 1, 5, 6, and 9. In some embodiments, the process of FIG. 12 is performed by an arbiter such as arbiter 105 and 905 of FIGS. 1 and 9, respectively. In various embodiments, the arbiter is a hardware arbiter that synchronizes the arrival of data and operations.

At 1201, initialization is performed on the control operation and the memory reads. For example, a control operation is initialed using a computational operation and prepared to be issued. As another example, the initialization includes calculating one or more memory addresses corresponding to data operands for a computational array and issuing the corresponding memory read requests. In some embodiments, the step of 1201 may be performed by a control unit and/or a hardware data formatter. Examples of a control unit include control unit 101 and 901 of FIGS. 1 and 9, respectively. Examples of a hardware data formatter include data formatter 104 of FIG. 1, weight formatter 106 of FIG. 1, data formatter 504 of FIG. 5, weight formatter 506 of FIG. 5, and data formatter 911 of FIG. 9.

At 1211, a memory read corresponding to one or more data operands is queued at an arbiter. For example, a memory read corresponding to a sensor data, such as data from a camera, is queued. In some embodiments, the data corresponds to an input channel of sensor data. In some embodiments, the memory read is queued at an arbiter such as arbiter 105 and 905 of FIGS. 1 and 9, respectively. In some embodiments, the memory read is queued in a read queue such as read queue 923 of FIG. 9.

At 1221, a memory read corresponding to one or more weight operands is queued at an arbiter. For example, a memory read corresponding to weight data is queued. In some embodiments, the weight operands are a two-dimensional image filter. In some embodiments, the weight operands are machine learning weights determined by training a machine learning model. In some embodiments, the memory read is queued at an arbiter such as arbiter 105 and 905 of FIGS. 1 and 9, respectively. In some embodiments, the memory read is queued in a read queue such as read queue 923 of FIG. 9.

At 1231, a control operation is queued. For example, a control operation corresponding to a convolution computational array operation is queued. As another example, a control operation corresponding to a matrix operation is queued. In various embodiments, the control operation is queued in a control queue such as control queue 103 and 903 of FIGS. 1 and 9, respectively. In various embodiments, the control operation describes a computational operation to be performed by a computational array.

At 1213, in the event access to memory is granted for a queued data read, processing proceeds to 1215. In the event access is not granted, processing loops back to 1213 until a later time when memory access is granted. At 1213, once memory access is granted, a data read is dequeued and the memory read for the corresponding data is performed.

At 1223, in the event access to memory is granted for a queued weight read, processing proceeds to 1225. In the event access is not granted, processing loops back to 1223 until a later time when memory access is granted. At 1223, once memory access is granted, a weight read is dequeued and the memory read for the corresponding weight is performed.

At 1215, a signal, such as a ready signal, is sent to the control queue to indicate that memory access has been granted for a data read and that the data element(s) will be read from memory. In various embodiments, the number of clock cycles to read data element(s) is fixed and the signal is used by the control queue to determine the appropriate timing for dequeueing the corresponding control operation for the data element(s) being read. In various embodiments, the signal is sent from the hardware arbiter that grants access for the memory read. In some embodiments, the memory read may be serviced from a cache (not shown). In some embodiments, the signal is sent once a memory read has completed and the data has been retrieved from memory.

At 1225, a signal, such as a ready signal, is sent to the control queue to indicate that memory access has been granted for a weight read and that the weight element(s) will be read from memory. In various embodiments, the number of clock cycles to read the weight element(s) is fixed and the signal is used by the control queue to determine the appropriate timing for dequeueing the corresponding control operation for the weight element(s) being read. In various embodiments, similar to 1213, the signal is sent from the hardware arbiter that grants access for the memory read. In some embodiments, the memory read may be serviced from a cache (not shown). In some embodiments, the signal is sent once a memory read has completed and the weight data has been retrieved from memory.

At 1235, a control queue receives one or more control signals from an arbiter. For example, a control queue receives a ready signal corresponding to a data read being granted access to read from memory. As another example, a control queue receives a ready signal corresponding to a weight read being granted access to read from memory. In various embodiments, the signals are not received at the same time or during the same clock cycle. For example, a memory that services a single memory read at a time will require the first read to complete before a second read can be performed. In some embodiments, at 1235, the control queue waits to receive a signal corresponding to each memory read issued and/or acknowledging that each of the operands has been read from memory (or a cache of the memory). In various embodiments, only once signals have been received for each of the corresponding memory reads of a control operation does processing proceeds to 1239.

At 1217, a read is dequeued and the corresponding data element(s) are retrieved from memory. In various embodiments, the read corresponds to the next data read in a read queue. In some embodiments, the next read to be dequeued corresponds to the data read that arrives first. For example, the next read is based on the time the data read is queued in the read queue. In some embodiments, the next read is based on the data read with the highest priority.

At 1227, a read is dequeued and the corresponding weight element(s) are retrieved from memory. In various embodiments, the read corresponds to the next weight read in a read queue. In some embodiments, the next read to be dequeued corresponds to the weight read that arrives first. For example, the next read is based on the time the weight read is queued in the read queue. In some embodiments, the next read is based on the weight read with the highest priority.

At 1219, the data element(s) retrieved from memory are formatted for a computational array. For example, the one or more data elements retrieved from memory are formatted by a hardware data formatter into a group of values to be provided together to and operated on by a computational array. For example, formatting may include formatting data arguments as a group of values that make up a portion of a two-dimensional region of sensor data and providing the group of values together to a computational array. In some embodiments, formatting includes formatting the data arguments based on a stride parameter. In some embodiments, formatting includes formatting the data arguments based on a padding parameter. In various embodiments, formatted may be performed by a hardware data formatter such as data formatter 104 of FIG. 1.

At 1229, the weight element(s) retrieved from memory are formatted for a computational array. For example, the one or more weight elements retrieved from memory are formatted by a hardware data formatter into a group of values to be provided together to and operated on by a computational array. For example, formatting may include formatting weight arguments as a group of values that make up an image filter and providing the group of values together to a computational array. In some embodiments, formatting includes formatting the weight arguments based on a parameter such as a matrix dimension, stride, padding, etc., as appropriate. In various embodiments, formatted may be performed by a hardware data formatter such as weight formatter 106 of FIG. 1.

At 1239, a control operation is dequeued and provided to a computational array. For example, a control operation corresponding to a computational array operation to be performed on matrix operands is dequeued from a read queue and provided to a computational array in sync with providing operands to the computational array. In some embodiments, a control operation corresponds to a matrix operation. In some embodiments, a control operation corresponds to performing a convolution operation. In various embodiments, the control operation is queued in a control queue and is only dequeued when all associated operands are retrieved or being retrieved from memory once memory access is granted. For example, a control operation associated with two groups of operands is dequeued from a control queue only after a first group of operands has already been retrieved and/or is being streamed from memory (or cache) and when a memory read associated with a second group of operands is granted access to memory. The latency to retrieve and format the second group of operands is a fixed number of clock cycles and the control operation is dequeued and provided to a computational array at the same clock cycle as the different groups of operands.

At 1251, a computational operation is performed by a computational array. In various embodiments, a control operation corresponding to a computational array operation and the operands retrieved from memory are available at the computational array at the same clock cycle. A computational operation is performed on the computational array operands made available to the computational array. In some embodiments, the computation(s) performed at 1251 correspond to the computation(s) performed at 309 of FIG. 3, 713 of FIG. 7, 815 of FIG. 8, and/or 1015 of FIG. 10.

In various embodiments, the process of FIG. 12 is performed in hardware using hardware solutions such as control signals, flip-flops, registers, and other appropriate techniques. Unlike a software implementation, various hardware embodiments of FIG. 12 utilize a clock signal to synchronize the arrival of operands and the control operation to a computational array. In various embodiments, once a control operation is dequeued, a fixed pipeline is utilized for presenting a control operation to a computation array. The fixed pipeline from the control queue to the computational array is matched to the fixed latency (e.g., number of clock cycles) to retrieve data from memory once access is granted by a hardware arbiter and the fixed latency to format the data for a computational array. In some embodiments, the fixed pipeline is based only on the fixed latency after data have been read from memory. In various embodiments, the computational operation and operand(s) are synchronized in a manner that provides for higher throughput and reduced power consumption. In some embodiments, the process of FIG. 12 allows for computational operations to be performed at a higher clock speed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A microprocessor system, comprising:
    a computational array that includes a plurality of computation units, wherein each of the plurality of computation units operates on a corresponding value addressed from memory; and
    a hardware arbiter configured to synchronize receipt of a subset of the corresponding values by the computational array with triggering of an operation of one or more computation units in the plurality of computation units on the subset of the corresponding values,
    wherein the hardware arbiter triggers the operation via issuing a control signal to a control queue based on the hardware arbiter granting memory access for the subset of the corresponding values, wherein a control unit is configured to queue operations in the control queue, wherein the control queue releases the operation based on the control signal, and wherein the subset of the corresponding values and the operation are received together at a same clock cycle by the computational array.

2. The microprocessor system of claim 1, wherein the hardware arbiter is configured to control issuing of at least one memory request for the subset of the corresponding values for the plurality of computation units and to schedule the control signal to be issued.

3. The microprocessor system of claim 2, wherein the hardware arbiter queues the memory requests in a read queue of the microprocessor system.

4. The microprocessor system of claim 1, wherein the computational array is configured to receive at least two vector input operands.

5. The microprocessor system of claim 1, wherein each computation unit of the plurality of computation units is configured to perform at least a portion of a dot-product component operation.

6. The microprocessor system of claim 1, wherein each computation unit of the plurality of computation units includes an arithmetic logic unit, an accumulator, and a shadow register.

7. The microprocessor system of claim 1, wherein the corresponding value addressed from memory corresponds to an input channel of sensor data.

8. The microprocessor system of claim 1, wherein the corresponding value addressed from memory of at least one of the plurality of computation units corresponds to a convolution value of a convolution filter.

9. The microprocessor system of claim 1, wherein the release of the operation corresponds to a dequeuing of a corresponding control operation from the control queue.

10. The microprocessor system of claim 1, wherein the operation includes a convolution operation.

11. The microprocessor system of claim 1, wherein the operation is performed on identifying features of an input data.

12. The microprocessor system of claim 1, wherein the memory is configured to dynamically adjust an allocation between a first portion of the memory for a data input and a second portion of the memory for a weight input.

13. The microprocessor system of claim 1, wherein triggering the operation is scheduled based on information identifying a fixed number of clock cycles until the subset of the corresponding values is received from memory.

14. The microprocessor system of claim 1, wherein the hardware arbiter is configured to grant a plurality of memory requests for the subset of the corresponding values, and wherein granting a last memory request of the plurality of memory requests triggers issuing of the control signal.

15. The microprocessor system of claim 14, wherein the hardware arbiter issues a plurality of control signals for the plurality of memory requests, and wherein the last memory request triggers release of the operation from the control queue.

16. A method implemented by a microprocessor system, the method comprising:
receiving an instruction for a hardware computational array, wherein a control operation associated with the instruction is included in a control queue, wherein a control unit is configured to queue control operations in the control queue, wherein the hardware computational array includes a plurality of computation units, and each of the plurality of computation units operates on a corresponding value addressed from memory;
queuing a memory request associated with the instruction at a hardware arbiter, the memory request being for a subset of the corresponding values, wherein the hardware arbiter is configured to control issuing of at least one memory request; and
scheduling a control signal to be issued based on granting of the memory request, wherein the control signal triggers the control queue to release the control operation,
and wherein the hardware arbiter schedules the control signal such that receipt by the computational array of the subset of the corresponding values is synchronized with receipt of the control operation at a same clock cycle.

17. The method of claim 16, wherein the instruction specifies at least a component of a matrix operation.

18. The method of claim 16, wherein the memory request is a variable latency memory request.

19. A microprocessor system, comprising:
a computational array that includes a plurality of computation units, wherein each of the plurality of computation units operates on a corresponding value addressed from memory and the corresponding values addressed from the memory are synchronously provided together to the computational array as a group of values to be processed in parallel;
a hardware arbiter configured to control issuing of at least one memory request for one or more of the corresponding values addressed from the memory, wherein the hardware arbiter triggers an operation of the computation units via issuing a control signal to a control queue based on issuing the at least one memory request, wherein a control unit is configured to queue operations in the control queue, wherein the control queue releases the operation based on the control signal, and wherein the hardware arbiter synchronizes receipt of the one or more of the corresponding values and the released operation by the computational array at a same clock cycle; and
a hardware data formatter configured to gather the group of values, wherein the group of values includes a first subset of values located consecutively in the memory and a second subset of values located consecutively in the memory, and the first subset of values is not required to be located consecutively in the memory from the second subset of values.

20. The microprocessor system of claim 19, wherein the at least one memory request is a variable latency memory request.

21. The microprocessor system of claim 19, wherein the hardware arbiter is configured to control issuing of a plurality of memory requests for the one or more of the corresponding values, and wherein issuing a last memory request of the plurality of memory requests triggers issuing of the control signal.

* * * * *

UNITED STATES PATENT AND TRADEMARK OFFICE
CERTIFICATE OF CORRECTION

PATENT NO. : 11,157,287 B2  
APPLICATION NO. : 15/920150  
DATED : October 26, 2021  
INVENTOR(S) : Emil Talpes et al.

Page 1 of 1

It is certified that error appears in the above-identified patent and that said Letters Patent is hereby corrected as shown below:

In the Claims

In Column 43, Claim 12, Line 13, delete "fora" and insert --for a--.

In Column 43, Claim 12, Line 14, delete "fora" and insert --for a--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*